US011334568B2

(12) United States Patent
Mohan

(10) Patent No.: US 11,334,568 B2
(45) Date of Patent: May 17, 2022

(54) DEEP CACHING IN THE DATA ACCESS LAYER OF AN ENTERPRISE PORTAL APPLICATION

(71) Applicant: Locus Robotics Corp., Wilmington, MA (US)

(72) Inventor: Vijay Mohan, Nashua, NH (US)

(73) Assignee: Locus Robotics Corp., Wilmington, MA (US)

( * ) Notice: Subject to any disclaimer, the term of this patent is extended or adjusted under 35 U.S.C. 154(b) by 368 days.

(21) Appl. No.: 15/926,690

(22) Filed: Mar. 20, 2018

(65) Prior Publication Data
US 2019/0294688 A1  Sep. 26, 2019

(51) Int. Cl.
*G06F 16/27* (2019.01)
*G06F 16/2455* (2019.01)
*G06F 16/22* (2019.01)

(52) U.S. Cl.
CPC .... *G06F 16/24552* (2019.01); *G06F 16/2282* (2019.01); *G06F 16/27* (2019.01)

(58) Field of Classification Search
CPC ........... G06F 17/3048; G06F 17/30339; G06F 17/30575; G06F 16/24552; G06F 16/27; G06F 16/2282
USPC ...................................................... 707/634
See application file for complete search history.

(56) References Cited

U.S. PATENT DOCUMENTS

| 5,611,076 | A | 3/1997 | Durflinger et al. |
| 6,363,388 | B1 | 3/2002 | Sprenger et al. |
| 6,457,020 | B1 * | 9/2002 | Carey ............... G06F 16/24524 707/763 |
| 6,553,409 | B1 * | 4/2003 | Zhang ................. G06F 12/0815 711/147 |
| 6,574,639 | B2 | 6/2003 | Carey et al. |
| 6,999,956 | B2 | 2/2006 | Mullins |
| 7,096,229 | B2 | 8/2006 | Dettinger et al. |
| 7,149,730 | B2 | 12/2006 | Mullins et al. |
| 7,177,825 | B1 | 2/2007 | Borders et al. |
| 7,483,915 | B2 | 1/2009 | Thompson et al. |
| 7,620,936 | B2 | 11/2009 | Ernst et al. |

(Continued)

OTHER PUBLICATIONS

Amazon Web Services, Inc. Database Caching Strategies Using Redis—May 2017, retrieved from Internet Feb. 16, 2018: https://d0.awsstatic.com/whitepapers/Database/database-caching-strategies-using-redis.pdf (22 pages).

(Continued)

*Primary Examiner* — Hosain T Alam
*Assistant Examiner* — Robert F May
(74) *Attorney, Agent, or Firm* — Sunstein LLP

(57) ABSTRACT

A method and system for data retrieval in an enterprise portal application. The method and system include receiving, in a data access layer, a request for object data from a business logic layer. The method and system further includes validating, by a schema layer in communication with the data access layer, that cache data of a cache and data of one or more databases of the enterprise portal application are synchronized. The cache data may include table data and index data of the one or more databases of the enterprise portal application. The method and system further include retrieving, if the cache is validated, table data from the cache, and returning the object data to the business logic layer, the object data corresponding to the retrieved table data.

22 Claims, 11 Drawing Sheets

(56) References Cited

U.S. PATENT DOCUMENTS

| | | | |
|---|---|---|---|
| 9,251,214 B2 | 2/2016 | Diaconu et al. | |
| 9,292,564 B2 | 3/2016 | Kamp et al. | |
| 9,430,552 B2 | 8/2016 | Adya et al. | |
| 9,449,068 B2 | 9/2016 | Ferrari et al. | |
| 9,495,398 B2 | 11/2016 | Parkkinen et al. | |
| 9,734,221 B2 | 8/2017 | Sarferaz | |
| 2006/0155776 A1* | 7/2006 | Aust | G06F 16/10 |
| 2006/0163338 A1* | 7/2006 | Allen | A01K 11/008 |
| | | | 705/29 |
| 2007/0299810 A1 | 12/2007 | Riedel | |
| 2008/0208806 A1 | 8/2008 | Dalfo et al. | |
| 2014/0181016 A1* | 6/2014 | Whitehead | G06F 11/2064 |
| | | | 707/613 |
| 2015/0074053 A1 | 3/2015 | Sarferaz | |
| 2015/0088815 A1 | 3/2015 | Billapati | |
| 2015/0142745 A1 | 5/2015 | Tekade et al. | |
| 2015/0256603 A1* | 9/2015 | Pillai | H04W 4/60 |
| | | | 709/246 |
| 2016/0124993 A1* | 5/2016 | Watson | G06F 16/20 |
| | | | 707/690 |
| 2016/0275150 A1* | 9/2016 | Bournonnais | G06F 16/25 |

OTHER PUBLICATIONS

Oracle—Oracle Times Ten Application-Tier Database Cache Data Sheet, retrieved from Internet Feb. 16, 2018: http://www.oracle.com/technetwork/database/database-technologies/timesten/overview/ds-timesten-cache-2215630.pdf (4 pages).

Oracle—Oracle Times Ten in-Memory Database Data Sheet, retrieved from Internet Feb. 16, 2018: http://www.oracle.com/technetwork/database/database-technologies/timesten/overview/ds-timesten-imdb-129255.pdf (3 pages).

Mohit Kumar Gupta, Vishal Verma, Megha Singh Verma."In-Memory Database Systems—A Paradigm Shift", International Jouranl of Engineering Trends and Technology (IJETT)—vol. 6 No. 6, Dec. 2013, ISSN: 2231-5381, pp. 333-336.

* cited by examiner

DEEP CACHING IN THE DATA ACCESS LAYER OF AN ENTERPRISE PORTAL APPLICATION

FIELD OF THE INVENTION

The invention described herein relates to enterprise portal applications. More specifically, the present invention relates to an enterprise portal application with full database caching for improved performance, efficiency and natural programming in the business logic layer of an enterprise portal application.

BACKGROUND OF THE INVENTION

In many applications, robots are used to perform functions in place of humans or to assist humans in order to increase productivity and efficiency. One such application is order fulfillment which is typically performed in a large warehouse filled with products to be shipped to customers who have placed their orders over the internet for home delivery.

Automated order fulfillment processes increasingly employ autonomous robots to pick products and assemble orders for shipping. Continuous monitoring of an automated order fulfillment process in warehouses served by autonomous robots is critical to maintaining efficiency and throughput. Remote monitoring of such warehouse management systems (WMS) by enterprise portals, each processing tens of thousands of orders simultaneously, creates high processing demands on the database servers of the enterprise portal application.

Order fulfillment by automated, robotic warehouses often requires customized business logic. Maintaining efficient information flows for customized business logic for enterprise portal applications using traditional methods is time consuming for programmers. Programming for high performance in the business logic layer requires specialized programming with knowledge of the underlying database architecture. As a result, the underlying business logic code is often disconnected from the real business logic requirements of the application, resulting in more lines of code and a higher potential for introducing errors during maintenance of the code. The reality of day-to-day programming of any complex enterprise application is that all the programming is tuned towards the most efficient way of reading and writing data from a traditional, relational database system. This results in code which obscures the real business logic and rules of the system and makes the program convoluted and twisted around the single goal of efficient database read/write, whereas the actual business application may have very different priorities on which the program should really focus upon.

Because of this focus shift, companies spend millions of dollars on such programs but get substantially limited return on their investment because of the inherent weaknesses of the database driven programming approach. Current computer program architecture focuses on attempting to solve this problem by adding more abstraction into the different layers of an enterprise application, thereby attempting to disconnect the business logic layer from the database. However, this substantially adds cost to the program development because of the need to add specialized programmers who have the skills to write such highly specialized code. Also, when the stream of data increases to hundreds of thousands or records going onto millions of records, even highly sophisticated systems regress to a database driven approach.

Ideally, the program should focus on the actual business logic and be domain driven, rather than database driven. Also, the system should be able to retain its simplicity and natural program flow while scaling from hundreds to thousands and to millions of records. Such a system, will be easy to understand, maintain and improve. Without this ability, systems tend to get more and more complex over time, and eventually get replaced with other systems programmed from scratch which also tend to eventually get into the same kind of issues. This is a cyclical process (adoption of newer technologies), which does not really solve the underlying root cause of the problem.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In a first aspect of the invention, there is a method of data retrieval in an enterprise portal application. The method includes a step of receiving, in a data access layer, a request for object data from a business logic layer. The method further includes a step of validating, by a schema layer, that cache data of a cache and data of one or more databases of the enterprise portal application which are synchronized. In the first aspect, the cache data includes table data and index data of the one or more databases of the enterprise portal application. The method further includes a step of retrieving, if the cache is validated, table data from the cache, and returning the object data to the business logic layer, the object data corresponding to the retrieved table data. In some embodiments, the cache data includes an entirety of the table data and schema data of the one or more databases.

In some embodiments of the first aspect, validating the cache comprises comparing a total database row count of the one or more databases with a cache row count. In other embodiments, the validating of the cache includes a step of comparing a maximum time stamp of the one or more database tables to a maximum time stamp of the table data stored in the cache, or comparing table data columns and table data types of the one or more database tables to table data columns and table data types for a corresponding table in the cache. In an embodiment, if the step of retrieving of the table data from the validated cache returns no data, returning null object data to the business logic layer.

In some embodiments, the cache may further include index data including indexes of the one or more databases. In this embodiment, the step of retrieving the table data from the cache may further include searching the indexes of the cache index data to locate the cache table data to be retrieved.

In another embodiment, the method may further include retrieving, if the cache is invalidated, table data from the one or more databases. In some embodiments, the step of retrieving of the table data from the one or more databases successfully retrieves table data, storing the table data in the cache, or, if the retrieving of the table data from the one or more databases fails to retrieve data, deleting the table data from the cache. In this embodiment, if the cache is invalidated, the method may include a step of waiting a finite time period during a database write operation and retrieving table data from the one or more databases if the write operation takes longer than a certain period of time.

In yet another embodiment of the first aspect, the method may include maintaining the validity of the cache by a schema layer in communication with a change management system. In this embodiment, the method may further include a step of sending, if the cache is invalidated, a message to the change management system to synchronize the cache with the one or more databases. In some embodiments, the method may further include periodically validating the cache by the change management system; and, if invalidated, synchronizing the cache to the one or more databases. In some embodiments, the schema layer of the data access layer may generate schema data that is identical to schema data generated by the schema layer in communication with the change management system.

In a second aspect of the invention, there is a data retrieval system for an enterprise portal application. The system includes a cache including cache data comprising table data and index data of one or more databases of the enterprise portal application. The system further includes a schema layer comprising database schema objects for representing the schema of the one or more databases. In this aspect, the schema layer is configured to generate schema data representing the structure of the database table. The system may further include a data access layer in communication with a business logic layer, the cache, the schema layer, and the one or more databases. The data access layer includes one or more cache access modules for providing communication between the data access layer and the cache, one or more database access modules for providing communication between the data access layer and the one or more databases, and a gatekeeper module configured to retrieve table data from the cache via the cache access modules in response to validation of the cache and further configured to retrieve table data from the one or more databases via the database access modules in response to invalidation of the cache. The data access layer is further configured to receive a request for object data from a business logic layer, validate, by the schema layer, that the cache data and data of the one or more databases are synchronized, retrieve, by the gatekeeper module, if the cache is validated, table data from the cache, and return the object data to the business logic layer, the object data corresponding to the retrieved table data, and In the second aspect of the invention, in some embodiments, the gatekeeper module may be further configured to store, if the retrieving of the table data from the one or more databases successfully retrieves table data, the table data in the cache, or delete, if the retrieving of the table data from the one or more databases fails to retrieve data, the table data from the cache.

In some embodiments of the second aspect, the validity of the cache is maintained by a schema layer in communication with a change management system. In these embodiments, maintaining the cache may include periodically validating the cache by the change management system and, if invalidated, synchronizing the cache to the one or more databases. In some embodiments the schema layer of the data access layer and the schema layer of the change management system generate identical schema data. In some embodiments, the schema layer of the data access layer and the schema layer of the change management system are instances of identical schema layers.

In a third aspect of the invention, there is a non-transitory computer readable medium including program instructions for execution by a processor of an enterprise portal application. In this aspect, the instructions cause the processor to receive, in a data access layer, a request for object data from a business logic layer; validate, by a schema layer in communication with the data access layer, that cache data of a cache and data of one or more databases of the enterprise portal application are synchronized, wherein the cache data includes table data and index data of the one or more databases of the enterprise portal application; retrieve, if the cache is validated, table data from the cache; and return the object data to the business logic layer, the object data corresponding to the retrieved table data.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein.

DETAILED DESCRIPTION OF THE INVENTION

Figure 1:
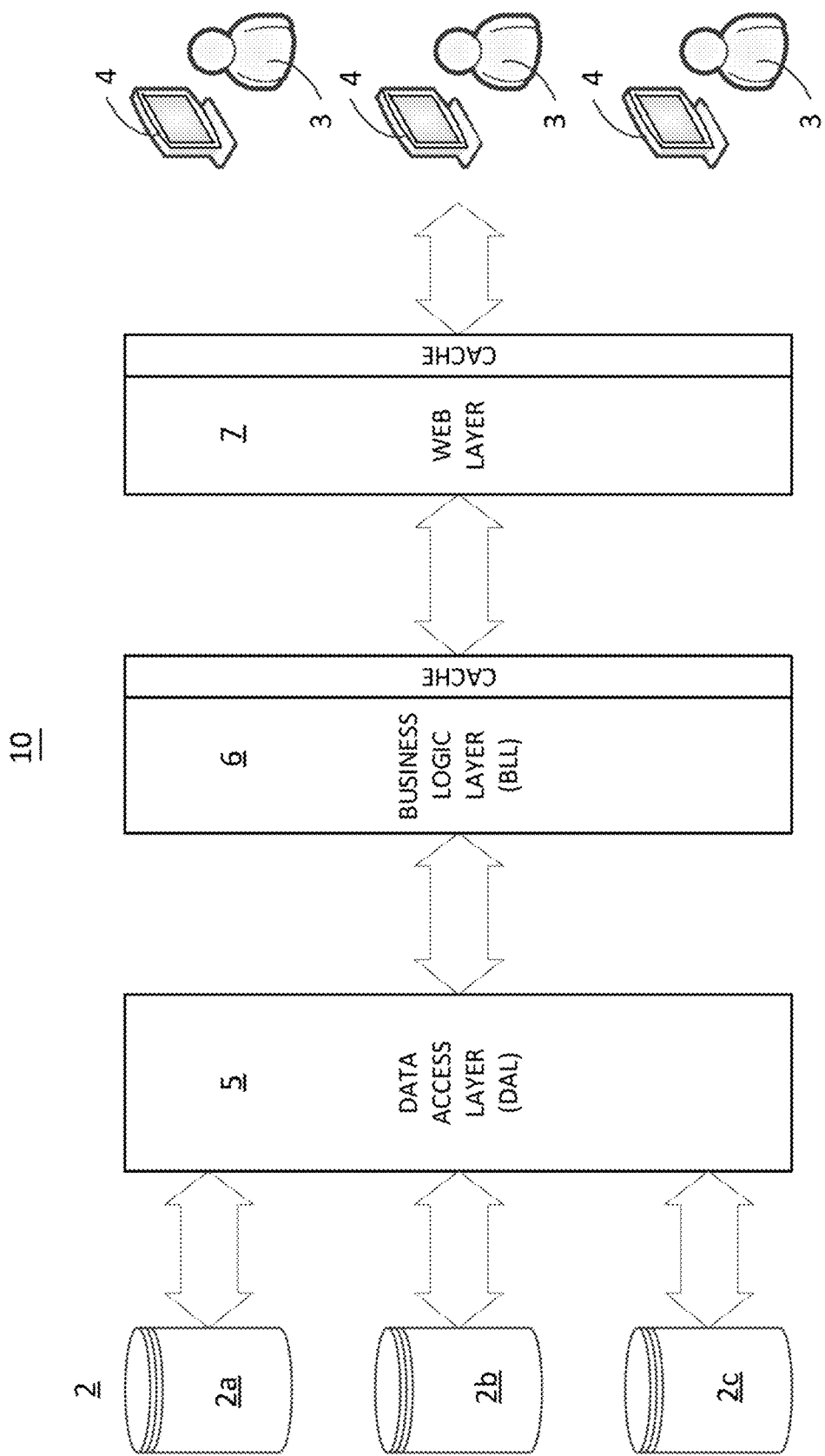
FIG. 1 depicts a typical prior art enterprise portal application for serving one or more users accessing through a web portal utilizing one or more databases.

The present invention is directed to methods and systems for providing enterprise-wide database applications improved performance, while simultaneously maintaining code transparency and efficiency in the business logic layer of enterprise portal applications. In addition, the foregoing describes a database architecture that enables a business logic component to directly invoke a data access layer component without regard to how many times the underlying database is invoked within the data access component, or as to how the data access is invoked. Additionally, the methods, systems, and architecture described herein allow the implementation of a domain level architectural model within the business logic layer (BLL), without resorting to complex layers of code to hide the database infrastructure and its constraints from the BLL.

Such methods, systems, and database architecture as herein described provides a business logic component of an enterprise portal application to be simpler and implemented with less human programming effort because it can be written without regard to any design or architectural constraints around the underlying database infrastructure, or to any optimizations of the same. Programmers can write code assuming that all the data required for application functionality can be retrieved as easily and quickly as if the entire database is available within in-memory data structures. Such code is easy to maintain and implement because the developer can focus on the business logic of the application rather than spending a significant amount of time optimizing the code for data retrieval or persistence.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure.

Although not restricted to any particular application, one suitable application for which the invention may be used is in an enterprise portal application for remotely monitoring order fulfillment warehouse management systems (WMS). The use of the invention in this application will be described to provide context accordingly. However, the examples and embodiments herein should not be construed as limiting the scope of the disclosure to enterprise portals serving order fulfillment WMS.

FIG. 1 depicts a conventional enterprise portal application 10. The enterprise portal application stores and accesses data in one or more databases 2 (2a, 2b, 2c) and provides for one or more users to view and interact with enterprise portal data through a (typically) web-based user interface.

Typically, the databases 2 of an enterprise portal application 10 are relational databases maintained by relational database management systems (RDBMS). The RDBMS of an enterprise portal application may be of a single RDBMS vendor or of different vendors. Relational databases are typically accessed by database commands based on the structured query language (SQL). A database schema associated with each relational database defines the structure, content, and interrelationship of the data stored therein. The databases may store data using schema unique to the database or may share database schema over multiple databases. The RDBMS receives the SQL command and may optimize the SQL command based on the schema before accessing one or more databases under its control.

Also shown in FIG. 1, an enterprise portal application 10 may use a data access layer (DAL) to translate data requests from a business logic layer (BLL) into SQL commands for accessing the one or more databases. The DAL 5 may translate BLL 6 requests into SQL commands based on the schema of each database. The RDBMS receives the SQL commands and performs the necessary operations to get the data from the databases. The DAL may then send to the BLL the requested data. The DAL may also receive data from the BLL and store the data to databases. Database accesses may be cached by the RDBMS for faster repeat access by an internal cache of each database managed by the RDBMS.

Typically, in an enterprise portal application, the DAL does no caching of its own. The BLL aggregates data from one or more DAL calls and caches this "processed" data in internal or external memory. Because this is processed data, it usually expires after a period of time because it is difficult if not impossible to determine when this "processed" data has expired based on changes to the underlying tables from where this data was initially aggregated.

In the typical enterprise portal application 10, the BLL requests to the DAL originate from user commands typically made at client interfaces 4. Users 3 of the client interfaces may access the enterprise portal using a web browser on a client computer. A web layer 7 of the enterprise portal application 10 receives user commands from the client interface 4, invokes the business logic of the BLL necessary to gather and assemble the requested data, and prepares the data for viewing by the user at the client interface. Data sent to the user at the client interface is typically cached in the web layer 7 for faster repeat access. Similarly, the data gathered and prepared by the business logic and sent to the web layer may be cached in the BLL as described in the previous section. This type of caching is "superficial caching" as the cache data is almost always expired after a period of absolute/relative time. This can be referred to as "edge caching" because the caching is usually done at the end "edge" of a layer, to the results of an operation which usually substantially obscures the origin of the resultant data object from the receiving code.

Figure 2:
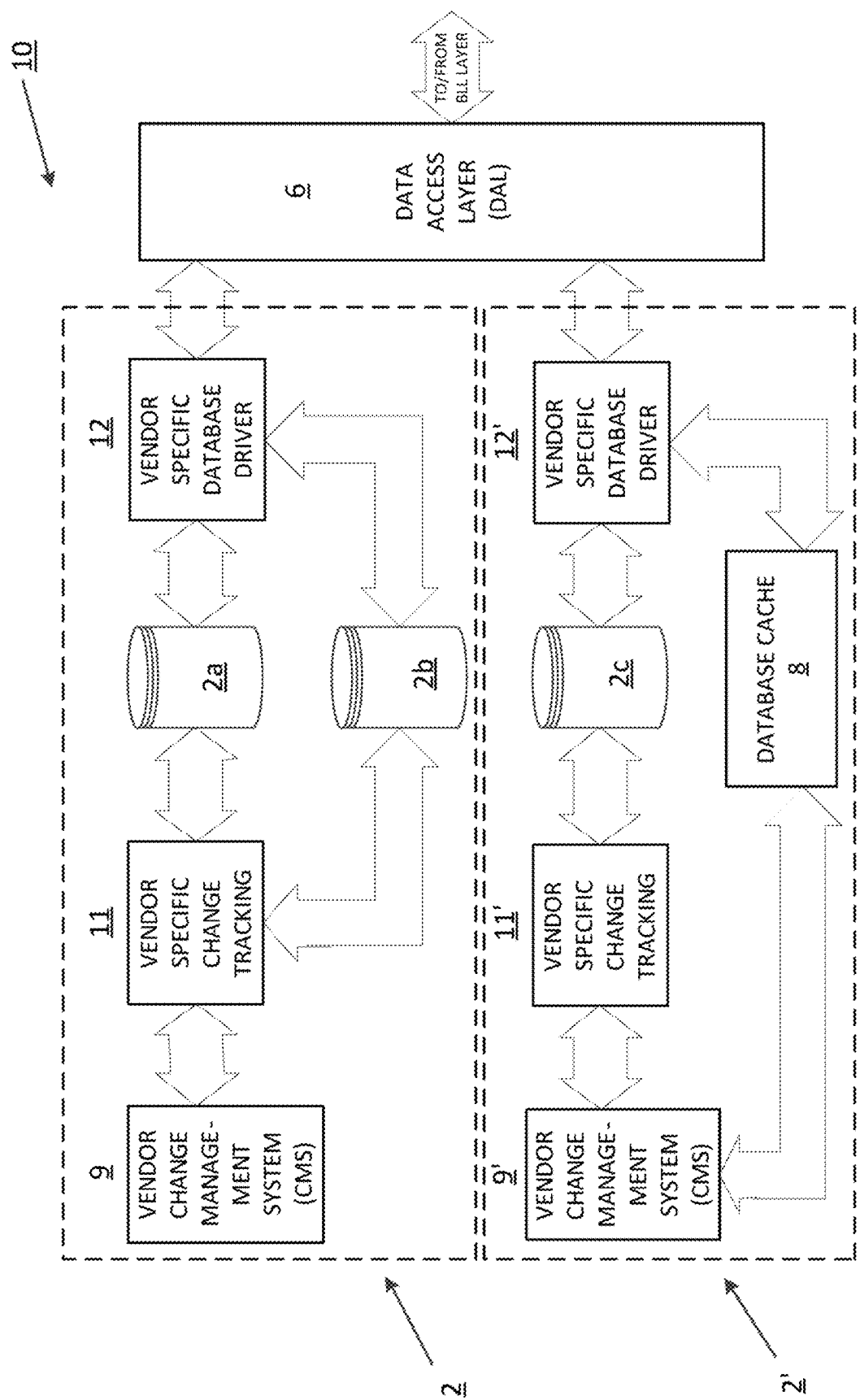
FIG. 2 depicts a typical prior art enterprise portal data architecture having a change management system.

FIG. 2 shows details of the internal RDBMS of a typical enterprise portal application 10. As shown in FIG. 2, each RDBMS 2,2' has a vendor specific database driver 12,12' in communication with the DAL 6 and one or more databases 2a, 2b, 2c. Each RDBMS may have a vendor specific change tracking module 11,11' and a change management system (CMS) 9,9'. The CMS 9 may allow developers and database administrators to manage changes in the underlying databases. Conventionally, a CMS in an enterprise portal application is not in communication with the DAL. The conventional CMS shown in FIG. 2 is a separate, database vendor specific component tasked with finding database changes and applying these "changesets" to the vendor specific database cache. Additionally, in some RDBMS 2', there may be a database cache 8 maintained by a vendor specific CMS 9' and in communication with the vendor specific database driver 12'. In a typical enterprise portal application, the CMS 9 may maintain consistency between the different databases 2a, 2b, 2c and their cache counterparts. Conventional CMS do not track and compare changes in one database compared to another database counterpart. Such conventional CMS do not have the ability to synchronize changes from one database to its remote counterpart database.

Business Logic Layer (BLL) Design

Conventionally, much of the business logic in the BLL of an enterprise application is devoted to ensuring: 1) that only data authorized for access by the particular user originating the request is provided by the BLL to the web layer for viewing by the user; and 2) that data is accessed from the databases in an efficient manner, according to the schema of the accessed database; and 3) that data is written to the databases transactionally, in an efficient manner, according to the schema of the accessed database. In a typical enterprise application, the first step of the business logic programmer is to: 1) identify all of the data needed for the business logic, and to get that data in one efficient database access call, and 2) identify all the points where data is modified and ensure that all the data changes are written to the database in one efficient database call. The programmer must insure that the user requesting the data is authorized to received it. Upon receiving the data, business rules are then applied to the data to create or limit the set of data to be sent to the web layer for presentation to the user.

This approach of getting all of the data in one database access in the BLL may be referred to as a database-driven design. In database-driven design, programming the business logic for efficient access requires substantial knowledge by the programmer of the performance implications of accessing vendor specific databases which can widely vary from one vendor to the other. Programming the business logic code for performance obscures the underlying business logic, making the maintenance of the code costlier and error-prone. Furthermore, vendors and database designers may change database schemas for reasons unrelated to the business logic and without the knowledge of the business logic programmers. Thus, optimizations built into the business logic code may be lost or even degraded with such changes. In contrast, the present invention makes possible a business-logic-driven design, with the attendant advantages and benefits to be further described below.

Data security in an enterprise portal application reflects what a particular user on a particular client interface, e.g. on a web browser page, may be shown at a given time. For example, specific data elements on a web page may be turned on and off based on user privileges. At times, the data shown on the web page itself may be different from another web page shown to a different user based on the user privileges. In a typical enterprise portal application, data security information is stored within a relational database. Because data security is critical in an enterprise application, security data is rarely cached. Therefore, most security-related business logic code executes directly on data retrieved from the security databases. Depending on the granularity of the security in the main user interface of the application, this can present a significant processing load on the database. It is very common to have a higher frequency of database calls related to security than the regular functionality of data accesses for the purposes of data retrieval or storage by the enterprise portal application itself. Accordingly, most enterprise web applications run slowly, even for pages which show limited amounts of information.

Furthermore, programming the business logic for user authorizations typically creates multiple lines of code for accessing user and other data from the security-related databases. For example, the code must identify and authenticate the user, determine the user's privileges and roles, and obtain security information about the requested data. Also, it is common to implement multiple different security authorization checks to view a single page in a typical enterprise application. User authorization code consists of several database accesses, which itself may benefit from database performance-aware programming.

The complex set of authorization checks which need to be made for a specific page, combined with the database optimization to ensure that the program puts the least load on the database ensures that most of the code within the BLL cannot be reused and is highly specific to the page being implemented. When combining performance considerations with user authorizations, conventional business logic programmers create code that is harder to understand and therefore easier to break or degrade during maintenance. This increases the risk of lapses in the data security and performance in an enterprise portal application. In contrast, the present invention makes possible the straight forward coding of business logic for user access and data security, thereby reducing the risk of data security breaches from programming and maintaining the business logic code.

Caching in an Enterprise Application

Caching in enterprise applications is typically used to improve the performance of applications that manage static data. Static data includes data that does not change very frequently, for example, news content, marketing content, and product catalogs. Examples of such applications include enterprise resource management systems, customer management systems, content management systems and e-commerce systems. Many applications today also cache dynamic data; however, this tends to be a manual process for the programmers and requires highly specialized programming skills. Dynamic data caching is usually done for high traffic websites like e-commerce applications, which need to be very responsive to user interactions.

In a typical enterprise application, caching is designed into the application after the design of the data access layer, as above described in view of FIG. 1. It is a "second-class citizen" in the design precisely because of its superficial, ephemeral nature as discussed in prior sections. In such applications, the business logic is programmed after the design of the data access layer. In the database-driven design approach, programming the business logic focuses on how data can be retrieved optimally from the already-designed database. Optimizing database accesses (e.g. reads and writes of data) overshadows the entire design of the business logic layer. As further explained below, the business rules, the purpose and flow of database reads and writes, which should be evident from a visual review of the code, instead become obscured, making it more difficult to implement new business rules as well as to maintain the pre-existing ones.

In many applications, the entire business logic is encoded into stored procedures within the database. This makes the business logic layer merely a component that passes data in and out, thereby keeping all the logic stored within hard to read, obscure SQL code. In such an extreme scenario, the database developer effectively becomes the business logic developer, using SQL to program the business logic—thereby losing all the advantages of modern, object-oriented programming languages, regressing back to the practice of procedural programming.

Typical caching schemes used by enterprise applications use "superficial caching." Superficial caching refers to caching data at the "edges" of one or more layers of the enterprise application which usually expire after a period of absolute or relative time. For example, superficial caching at the "edge" of a BLL as well as the web layer represents a brute force, less efficient approach—because the data stored into this BLL/web layer cache (as shown in FIG. 1) is "expired" at some interval. The cached data is therefore only temporarily available and inconsistently so, thereby limiting the improvement of the performance of the enterprise application as well as its consistency and stability. There is always the possibility that some data which is being shown to the user has already expired in the database and hence is stale. This can manifest in many ways including when users put items in the shopping cart, for example, during high volume "Black Friday" shopping events, and suddenly lose the contents of the shopping cart on a page refresh, or unstable program behavior during high traffic shopping days of the year.

Data returned by the BLL and web layers is "computed data" as opposed to the "raw data" that is available at the DAL. This is important to the purposes of this discussion because computed data is often aggregated from multiple database sources. Hence, it is almost always impossible to precisely determine when it has become stale (even if some conventional change tracking mechanism was available, for example, polling the database). This is especially pronounced when the data retrieved at the DAL is the result of a complex SQL query where the origins of how the data got into the way it is structured is completely lost because it depends on the joins performed by the SQL query itself. A consistently available cache, in a conventional enterprise application, requires that the application cache non-computed data so that the cache never expires and is always up-to-date with the database. Even if the data used in the computation of computed data is cached, the cached data may time out after a short interval, thus requiring the re-computation of computed data for each future data request. A consistently available cache, in a conventional enterprise application, also requires that the developer be able to query the cache in SQL like fashion without having to scan through all the rows. This means that the cache should also provide most of the indexes available in the corresponding relational database so that data retrieval from the cache is not slowed down during high traffic scenarios. Hence, to substantially reduce database load, the cache needs to store all the data while maintaining most of the indexes required to efficiently and quickly return the information requested by the user.

Finally, in a typical DAL of a conventional enterprise application, caching is never done within the DAL. Caching at the DAL of the present invention, in the manner described herein, may be referred to as "deep caching." Conventional deep caching, which may use a vendor specific database drivers 12 between the DAL and the database, necessarily constrains the database schema design and imposes limits on how cached data may be retrieved. As described herein, a "generic" solution for deep caching, which does not require a vendor-specific database driver, can work for any kind of database without such restrictions and without requiring changes or reconfiguration for different database schemas. This provides for the caching of any database without restrictions, thereby allowing systems to fully utilize the maximum benefits of caching in any scenario without artificial limitations on what data can be cached, or how this cached data can be retrieved.

In-Memory Databases

One known method of caching in the conventional enterprise application is "in-memory" database caching. In-memory database caching moves one or more databases under the control of an RDBMS from conventional disk storage to random-access-memory (RAM). To the extent that RAM access is faster than static memory storage (e.g. magnetic disk drive storage), with the database residing fully in RAM, overall performance is improved.

In addition, in-memory databases may be improved upon by using faster storage means. Some vendor-specific RDBMS with in-memory database capability may optimize the data structures, indexes, and proprietary data access algorithms. Each vendor of commercially available in-memory databases has a unique database schema. In memory database caching have many disadvantages such as, for example, the inability to use full SQL and lack of support for atomicity, consistency, isolation & durability ("ACID").

Vendor-specific in-memory databases are designed for real-time systems. In-memory databases, implemented in the vendor specific way, the "cache" may be separate from the BLL, rather than as an "edge" cache as shown in the conventional system of FIG. 1. Hence, in-memory databases can very useful for applications like stock markets, for real-time trading data but not historical data for past trading periods. However, in-memory databases may not support the full capabilities of SQL, such as complex report generation.

According to other aspects of the invention, removing loading away from RDBMS, data queries may search vast amounts of data using the full SQL commands. Thus, the typical, relational, hard drive bound RDBMS is free to do optimally what it was designed to do. Whereas, conventional RDBMS were never designed for high frequency calls on fast changing data, by redirecting high frequency data accesses to the full database cache as described herein, aspects of the invention cause the enterprise portal allocation to behave like a real-time database for high frequency accesses. Hence, the system and methods described herein are also able to bring many of the biggest advantages of utilizing an in-memory database to the system, while being able to store and report on large amounts of consistent, relational data.

Multi-Tenant Enterprise Portal Applications

Enterprise portal applications typically restrict data access to authorized users. Authorized users may have access to one or more of the databases in whole or in part. User access may be limited to data associated with the user's privilege or role within their company, or to specific databases, or to subsets of data, for example, to the database associated with a particular order fulfillment warehouse.

The databases of an enterprise portal application may also contain proprietary data of one company, or it may contain proprietary data of multiple companies. Enterprise portals serving multiple companies may be referred to as "multi-tenant." Users of a multi-tenant enterprise portal applications typically access and share data from their respective companies, but are prevented from accessing the data of other companies whose data may be co-located in the databases of the same enterprise portal application.

In a multi-tenant enterprise portal application, the databases may be relational databases maintained by relational database management systems (RDBMS) of one or more different vendors. The database schema associated with each relational database may define the same or different structure, content, and interrelationships of the data stored therein. The relational databases in a multi-tenant enterprise portal may be accessed by commands based on the structured query language (SQL). The databases may store data using a database schema unique to the database or may share database schema over multiple databases. The RDBMS may receive the SQL command and may optimize the SQL command based on the schema and the particular vendors' algorithms before accessing one or more databases under its control.

The Enterprise Portal Application

Figure 3:
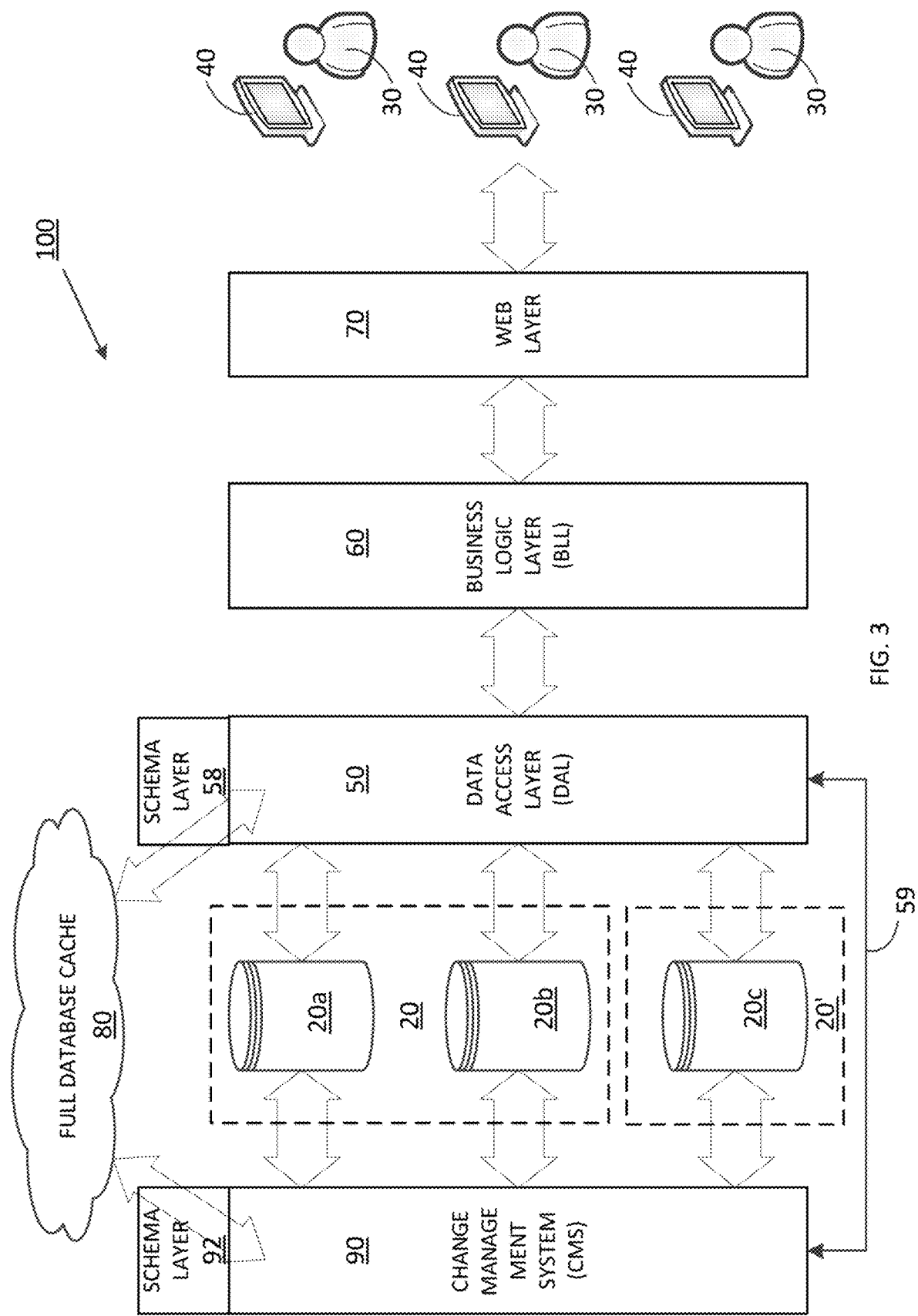
FIG. 3 depicts an enterprise portal application for serving one or more users accessing one or more databases, according to one aspect of the invention.

FIG. 3 depicts an embodiment of an enterprise portal application according to one aspect of the present invention. As shown in FIG. 3, an enterprise portal application 100 stores and accesses data in one or more databases 20a, 20b, 20c to provide one or more users 30 views of the data through (typically) web-based client interfaces 40. A database schema associated with each of the databases defines the structure, content, and interrelationships of the data stored therein. The database schema may be unique to each database or a particular schema may apply to one or more of the databases. The databases may be managed by one or more RDBMS 20, 20' served by a single-vendor RDBMS or different vendors.

In FIG. 3, the RDBMS 20,20' may include the vendor specific drivers and vendor specific change tracking and change management systems (as depicted in FIG. 2), including a "local" database cache for each of the RDBMS. The databases may be accessed by SQL commands received and processed by the RDBMS. It will be apparent to one skilled in the art that database commands other than SQL commands may be used to access the databases of the present invention, and that without loss of generality, the databases referred to herein may take other forms, including non-relational databases. It will be understood that in referring to interactions with a database, for example, in receiving and processing data access requests using SQL, this assumes interactions with the RDBMS containing the database. Data stored and retrieved from the databases 20a,20b,20c may be cached by the RDBMS for faster repeat access using an internal cache (not shown).

In one embodiment, enterprise portal application 100 may use a DAL 50 to translate data requests received from a BLL 60 to SQL commands used for accessing data in the one or more databases 20. In turn, the DAL may translate the business logic requests into SQL commands based on the schema of the databases. The SQL commands may request that data be stored or retrieved. The databases may receive the SQL command from the DAL and perform the necessary operations on the database to store or to retrieve the requested data. The DAL may provide the BLL with the requested data for further processing.

Business logic data access requests sent to the DAL 50 may originate from user commands initiated at a client interface 40 of the enterprise portal application 100. A web layer 70 of the enterprise portal application may receive user commands from the client interfaces 40, invoke the business logic of the BLL, format the requested data in a suitable data format (e.g. HTML, JSON, etc.), and then send the data for viewing by the user 30 at the client interface 40. Viewing by a user at a client interface may include other displays and interfaces than those depicted in FIG. 3, and may include non-viewing client interfaces, without limitation, such as interfaces that capture and store data for further processing, storing, or retransmitting. Data sent to the client interface by the web layer 70 may be cached by the web layer. Portions or all of the data sent to the client interface may be cached at the client interface. Similarly, data provided to the web layer 70 from the BLL 60 may be cached in the BLL as described above for a conventional enterprise portal application.

Users 30 of the client interfaces 40 may access the enterprise portal application 100 using a web browser on a client computer, as shown in FIG. 3. User access, however, may be limited to data associated with the user's privilege or role, or to specific databases or to subsets of data based on other information. User access may be determined in the BLL by business logic code. Business logic code may include requests for user information, company information, privilege information, role information, and other information regarding user access authorization, including information about the databases to be accessed. Users may have access to one or more of the databases in a single or multi-tenant enterprise portal application as above described.

In one aspect of the invention, as shown in FIG. 3, there is a full database cache (FDC). In general, the FDC 80 of the enterprise portal application described herein improves the performance of the DAL 50 by accessing the FDC 80 when responding to data access requests from the BLL 60. As shown, the FDC 80 is in communication with the DAL 50 of the enterprise portal application 100. The FDC 80 may cache one or more of the databases 20 or multiple of the databases simultaneously in one DAL-accessible FDC. The FDC 80 may reside in a memory of a host computer or server housing the DAL 50 or in another memory or storage means accessible to the DAL 50, such as over a computer network.

Preferably, the FDC 80 is in communication with a change management system (CMS). The CMS 90 responds to changes in the databases 20 caused by updates to the data therein, changes to the schemas associated with each of the databases, and other changes that would otherwise render the FDC 90 incomplete, not up-to-date, or invalid for providing the DAL 80 with data requests. As shown in FIG. 3, and to be further described below, each of the DAL 50 and the CMS 90 may use a schema layer (58 and 92 respectively) for enabling such operation. Furthermore, the FDC 80 may reside in a memory of a host computer or server housing the CMS 90, or in another memory or storage means accessible to the CMS 90, such as over a computer network. Additionally, in some embodiments, the DAL 50 may be in communication with CMS 90 via a message queue 59.

Each of these components, the FDC 80, the DAL 50, and the CMS 90, their operation and interoperation, will be described more fully below.

The Full Database Cache

Figure 4:
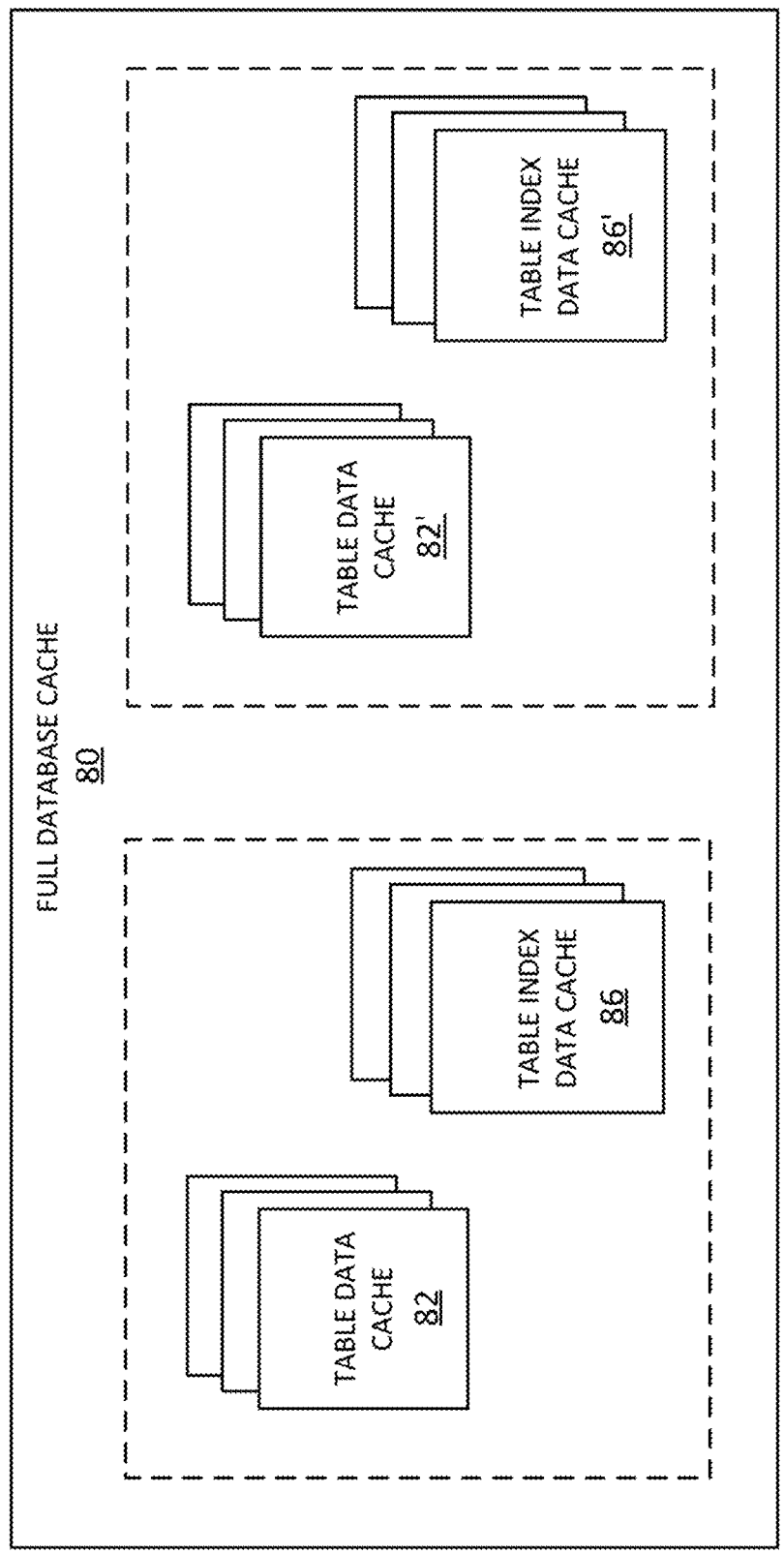
FIG. 4 depicts a full database cache in an enterprise portal application according to one aspect of the invention.

FIG. 4 depicts the structure and content of one embodiment of a full database cache (FDC) according to the present invention. As shown, the FDC 80 aggregates table data and index data of one or more databases 20a,20b,20c of enterprise portal application 100. The table data cache 82 and table index data cache 86 may store table data and index data for one of the databases cached by the FDC. The table data and index data of each separate database may be stored in separate table data cache 82' and table index data cache 86'. Additional table data and index data may be stored accordingly.

Herein, table data includes data arranged in rows and columns, with rows representing records and columns representing fields within each record, the set of table data. One skilled in the art would recognize that the particular organization of the data as in a "table" represents a conceptual representation of how records may be stored in a database, and that each field of each table may represent, without limitation, any type and form of data conventionally stored in computer databases.

One skilled in the art would understand that table data cache 82,82' may be any data of any type necessary or ancillary to the enterprise portal application 100, including, but not limited to, table data for storing user logins, user profiles, user rights, user roles, user privileges, user addresses (physical or electronic, e.g., building, office, email or network address). Table data cache 82,82' may include, without limitation, company data and company enterprise resource planning data, for example, automated order fulfillment warehouse data. Company data may include, without limitation, company identification data, company personnel data, company management data, company operations data, company marketing data, company product data, and company security data. Warehouse data may include, without limitation, warehouse inventory data, warehouse location data, warehouse personnel data, warehouse security data, and data regarding automated systems in service of warehouse enterprise portal applications, including robot data. Table data cache 82,82' may further include, without limitation, reference lists such as countries data, time zones data, geographic data, wide-area and local-area network topography and communications security data.

The table data cache 82,82' is the actual row data for each row of the database table. In an embodiment of the present invention, table data cache 82,82' may represent any table of data capable of representation in a relational database, and may represent additional information about the data or database, for example, primary keys, foreign keys, and database constraints. In this manner, table data cache 82,82' may thereby optimize the FDC using indexed columns for identifying and storing the primary key values for a table row in an indexed column cache rather than the entire row.

The FDC 80 may additionally comprise index data cache 86,86' that relate the cached data in one or more rows or columns of table data cache 82,82' to data in one or more other rows or columns of other table data. The index data cache 86,86' are "tables" containing the column values of an index, along with the primary keys of the rows that contain all the same column values of the indexed row. For example, the indexed row for the "Person" table for the column "FirstName" will contain a specific first name, and its contents will be a list of all the primary keys for rows that contain this first name. This allows the DAL to search the index to get all the rows for a particular first name, rather than having to scan through all the cache rows to get matching rows. This is a significant advantage which substantially improves performance and helps significantly reduce both database as well as cache loads. In one embodiment, the index data cache 86,86' include both single- and multi-column indexes, thereby ensuring that all searches of the table data cache 82,82' may employ indexes, rather than requiring a search of each row of the tables in table data cache 82,82'. Multi-column index data allow access to rows that match values in more than one column, for example, a list of columns "FirstName", "LastName", and "ZipCode". In another embodiment, adding indexed columns in the FDC allows simple joins from all the data in the FDC, thereby reducing the number of reads on the database. Index data cache 86,86' improves the performance of searching the table data cache 82,82' of the FDC and allows the return of simple join operations on table data cache 82,82' from the FDC to the DAL.

As above described, the performance improvement provided by the FDC to the DAL in faster data accesses frees programmers of the business logic code in the BLL from the complications above described for conventional enterprise applications. That is, the BLL may rely on the DAL and FDC to cache database data for access by the BLL without involving database schema considerations in the code to maintain high performance. It is to be noted that, even if the DAL cannot service all the calls using the full database cache, merely serving a portion through the FDC can significantly reduce database load. For example, a substantial number of database calls made in a portal application are simple calls which either directly use primary keys or do simple joins. Even to the extent that the FDC only services these relatively simple calls, a significant reduction in database load can be realized, thereby freeing up the database to quickly process more complex calls. With currently available technologies, object oriented programming languages can make SQL like queries on in-memory data structures, thus enabling the cache to service even complex calls, thereby reducing database load even further. Hence, the effectiveness of the full database cache is enhanced because even more calls can be serviced by the cache. The operation of the FDC in communication with the DAL and the CMS along with other advantages and benefits attending thereto are further described below.

The Data Access Layer

Figure 5:
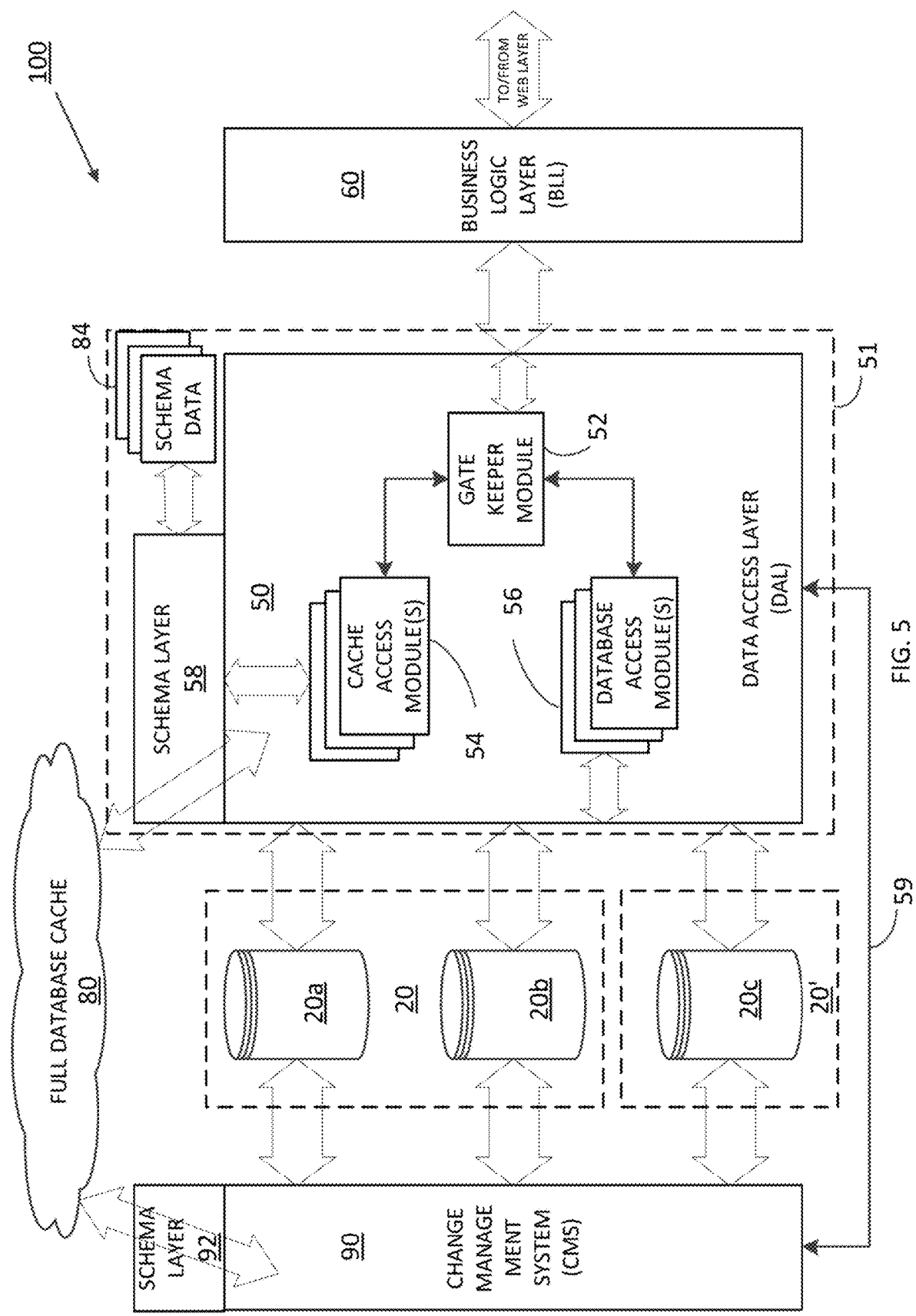
FIG. 5 depicts a data access layer in an enterprise portal application according to one aspect of the invention.

FIG. 5 depicts an embodiment of a DAL 50 for use in an enterprise portal application 100 according one aspect of the present invention. The DAL 50 comprises a gate keeper module 52, one or more cache access modules 54, and one or more database access modules 56. The DAL 50 further comprises a schema layer 58 for communication with the full database cache 80 and the one or more cache access modules 56. The structure and operation of each of these components will described more fully below. Schema layer 58 may reside within the memory space 51 of the DAL 50.

The DAL also includes schema data 84 that is generated by the schema layer 58 and stored in the memory of the application hosting the DAL. Schema data 84 may reside within the memory space 51 of DAL. Schema data 84 is data that defines the structure and content of the FDC 80, and the interrelationships between its table data 82. Schema data 84 may include objects representing the structure of the rows and columns of the table data; the type, range, representation, and format of the fields of the table data; and the interrelationships between and among the tables, records, and fields of the table data 82. One skilled in the art would recognize that the particular organization of the schema data 84 as objects is a conceptual representation of how schema data may stored and manipulated, and that each "object" of the schema data may be represented by, without limitation, any type, form, and structure of data objects of a conventional object-oriented schema.

The schema data 84 is used by the schema layer 58 during data access and updates to allow the FDC to validate the structure of the data, which is read and updated. For example, it prevents the scenario where a row from table "Person" may attempt to be written to the table "Company" in the cache. The FDC can do this because it knows that a row from a specific table will have specific column names of specific types like integer, text, date, etc. The schema data 84 for the same table is the list of columns along with their types and relationships to other tables. In an embodiment, the schema data 84 may instead or additionally be included in the FDC of FIG. 4. However, caching systems do not perform well with large blocks of data, rather these systems prefer small key, value pairs; thus including schema data 84 in the FDC may reduce system performance. Also, having the schema data in the FDC can cause concurrency issues because multiple client applications try to read or modify the schema data at the same time (because the applications host the schema layer).

As shown and described above FIG. 2, the RDBMS 20,20' may include the vendor specific drivers and vendor specific change tracking and change management systems (as depicted in FIG. 2), including a "local" database cache for each of the RDBMS. The databases may be accessed by SQL commands received and processed by the RDBMS. One skilled in the art would understand that database commands other than SQL commands may be used to access the databases of the present invention, and that without loss of generality, the databases referred to herein may take other forms, including non-relational databases. It will be understood that in referring to interactions with a database, for example, in receiving and processing data access requests using SQL, this assumes interactions with the RDBMS containing the database. Data stored and retrieved from the databases 20a,20b,20c may be cached by the RDBMS for faster repeat access using an internal cache (not shown).

In general, the DAL 50 performs and satisfies database access requests from the BLL 60. In a preferred embodiment, for a given data access request, the DAL attempts to check the validity of the cache to be able to successfully handle the specific data access request. If the validity check fails, the DAL queries the database for the requested data. If the database returns data, the DAL updates the FDC with the resulting data. If the database does not return data (implying that the data is absent from the database), the DAL deletes the data from the FDC.

All modifications done by the DAL directly to the FDC are merely failsafe mechanisms which are not necessary for the system to function. These FDC modifications done by the DAL also allow changes to more quickly get updated in the cache, rather than the typical "refresh" rate of the CMS. Note also that, while a database write is happening, the DAL class temporarily suspends (e.g., sleeps or waits) all read calls until after the cache is updated—ensuring that any database reads in the time between the database write and the cache write (in milliseconds) does not fetch stale data from the cache. Database reads wait for a total of 500 ms before "failing over" and causing the DAL to call the database instead of waiting for the write operation to complete. Note that the same mechanism can also be used to service calls for data across database tables—nothing in the design prevents the DAL from using the cache to retrieve data joined from two different tables (as an example). Note that the problem in retrieving data from the cache (a data retrieval issue) is completely different from the problem of creating the cache and keeping it in synchronization with the database and is only limited by the programming language & caching technology used.

Figure 6:
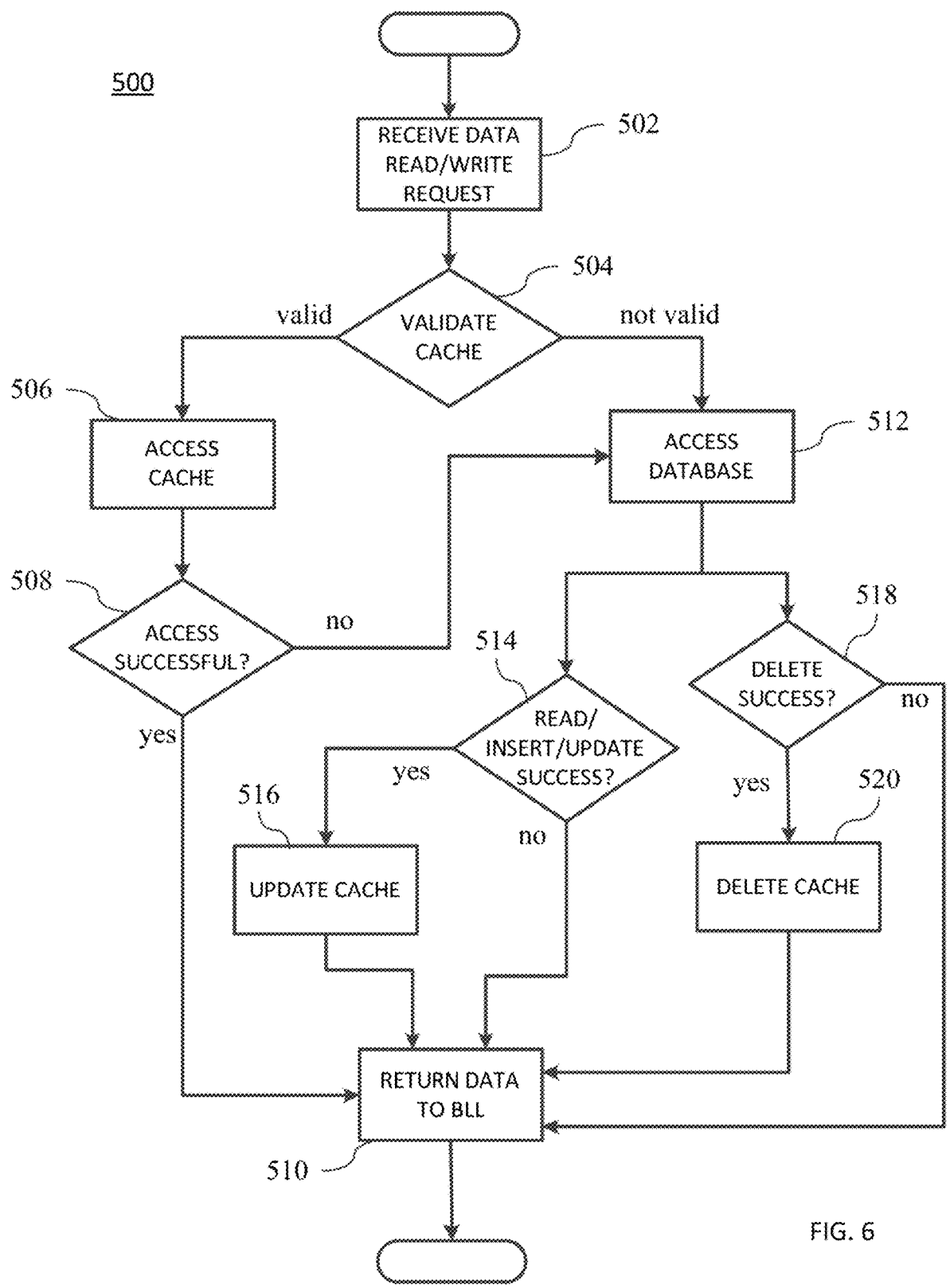
FIG. 6 is a flowchart depicting the operation of the data access layer of an enterprise portal application according to one aspect of the invention.

As depicted in FIG. 6, in one aspect of the invention, beginning at step 502, upon receiving a request for data from the BLL, the gate keeper module 52 may check the validity (step 504) of the FDC. If the FDC is valid, at step 506, the gate keeper module 52 requests data from the FDC using one or more of the cache access modules 54. The cache access modules 54 may, in turn, use the schema layer 58 to access data in the FDC 80. If the data request is successful (step 508), the cache access module may return table data to the gate keeper module 52. The gate keeper module 52 (at step 510) may return to the BLL the table data received from the cache access module as object data. If the cache validity check is unsuccessful, the gate keeper module may request data using the database access modules (step 512). It is understood by one skilled in the art that the cache access modules may return data other than table data to the gate keeper module, and that the gate keeper module may return data other than object data, without loss of generality of the methods described herein.

Note that in the preferred embodiment, the DAL does not attempt to retrieve data from the cache and then call the database if no data is received from the cache. As explained previously, this conventional, "superficial" caching technique substantially reduces the performance of caching in a system. This is because, a database call will be made for every data access request for which a row genuinely does not exist in the database. Because this results in unwanted database calls, this also increases the load on the database substantially. For example, to check whether a particular user has access to a feature, when the user actually does not have access to it, a database call will always be made, and it will always return no results. The methods and systems described herein make possible the scenario where the condition of "no results obtained" from the cache can be trusted as-is by the DAL First, the DAL checks the cache validity—and if it is valid, the DAL uses the cache results whether it returned data or not. In conventional caching systems, where cache validity is difficult or impossible to detect, the cache may correctly return no data, but that "no data" is returned cannot be relied upon. Only a subsequent database call can confirm the "no data" event, thus nullifying the advantage of having the cache where rows do not exist in the underlying database. Here, because cache validity is known, the DAL does make a database call if the cache returns no data when the cache is determined valid. These and other embodiments of the operation of the DAL in serving BLL data requests are further described.

Returning to step 504, if the full database cache is not valid, at step 512, the gate keeper module 52 requests data using the database access modules 56. In some embodiments, a database access module may send a data request to the RDBMS in the conventional manner (e.g., SQL command). Database access may be a read access, an insert access, and/or an update access. If, in step 514, the read, insert, or update access is successful, the database access module may update the cache (at step 516) and then return table data (step 510) to the gate keeper module 52. At step 510, the gate keeper module may return to the BLL the table data received from the database access module as object data. At step 510, the gate keeper module may return to the BLL the table data received from the database access module as object data. Database access may also be a delete access. If, in step 518, the delete access is successful, the database access module may delete table data from the cache (at step 520) and then return data (step 510) to the gate keeper module 52.

It is understood by one skilled in the art that the database access modules may return data other than table data to the gate keeper module, and that the gate keeper module may return data other than object data, without loss of generality of the methods described herein.

In a preferred embodiment, if the gate keeper module 52 is successful at requesting data from the database, at step 516, the gate keeper module 52 may update the requested data to the FDC. Optionally, if the data access request by the database access module is unsuccessful, the gate keeper module 52 may delete the corresponding data from the FDC. This step may be implemented for redundancy and to handle the possibility of an error in the CMS code having caused the cache to be out of synchronization with the database.

It would also be understood by one skilled in the art that database access principles such as "roll back" may be applied, for example, when exceptions occur during table updates. Thus, in a preferred embodiment, if multiple tables in the database are modified within a single database transaction which could rollback because of failures in any one table modification operation, such database calls done by the DAL do not update the cache so that if the transaction rolls back, the cache integrity is not affected. As such, an insert or update access in step 514 (FIG. 6) for multiple table inserts or updates, would not update the cache (step 516) until after a commit operation to the database of all tables inserted or updated, and not update the cache for the multi-table insert or update on a rollback transaction following an exception. Accordingly, this preserves the integrity of the FDC during multi-table access operations.

Also, in some embodiments, the DAL component can choose to reload the cache for the affected DAL components thereby updating the FDC "as soon as possible" as opposed to waiting for the CMS to do the same. To access the cache for writing data to the cache, the DAL calls the cache access modules, which use the schema layer 58 to validate the write before doing the actual write. Similarly, to validate the cache, the DAL requests the validity check via the cache access modules, which use the schema layer 58. The schema layer 58 will now be more fully described.

The Schema Layer

Figure 7:
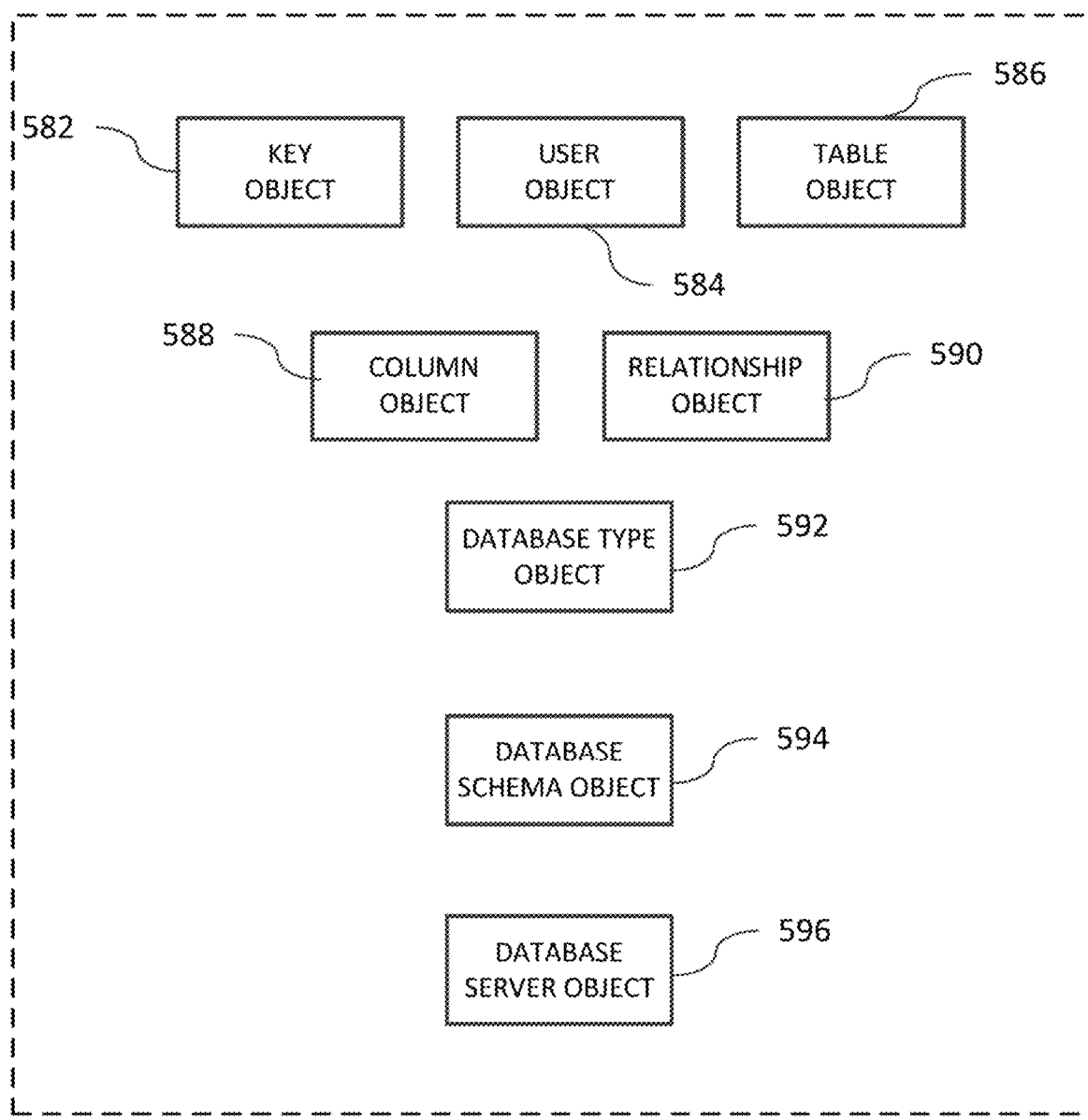
FIG. 7 depicts the objects of a schema layer of an enterprise portal application according to one aspect of the invention.

FIG. 7 depicts the objects of the schema layer 58 for use by the DAL 50 of FIG. 6. The objects of the schema layer 58 are created by calling the database to retrieve the structure of the database, then representing the design components of the database structure using object-oriented programming. One ordinary skill in the art would understand that such object-oriented representations may take the form of classes or a hierarchy of classes or other commonly used object-oriented structure, which in turn create instances of objects for representing the database structure.

According to one aspect of the invention, schema layer 58 includes data objects: Key, User, Table, Column, Relationship, Database Type, and Database Schema. Each of these objects is briefly described as follows:

The Key object 582 represents the primary and foreign keys of the relational database. Instances of key object 582 define index keys to tables, records, and fields that can be selected, searched, and joined by database access operations on the FDC.

The User object 584 represents a database user. Instances of user object 584 represent database user names, for example, "smithsam".

The Table object 586 represents database tables. Instances of table object 586 represent the structure of a database table.

The Column object 588 represents columns in the tables of a database table. Instances of column object 588 represent the various properties of a database table column.

The Relationship object 590 represents the relationships between tables of a database. Instances of the relationship object 590 define foreign keys between database tables.

The Database Type object 592 represents types available in the database. Instances of the Database Type object 592 represent the type, format, and representation of data in table objects and column objects of the schema layer including, but not limited to: smallint (small integer), bigint (big integer), and text, which may be different from data types available in a conventional programming language (e.g. C #).

The Database Schema object 594 represents the schema of a database in the FDC and is the top-level object in the hierarchy of schema layer objects. Instances of the Database Schema object 594 comprise collections of instances of schema layer objects, including, but not limited to: User objects, Table objects, and Relationship objects. An instance of a Database Schema object fully defines the particular schema of the database cached by the FDC. Accordingly, the collection of schema objects as described above, stored as schema data, represents the schema of the FDC, the data of which itself is stored as table data and index data.

In addition, schema layer 58 includes at least one service object: the Database Server object. Instances of the Database Server object 596 represent the database server which hosts the database itself. In addition, the Database Schema object may including Stored Procedure objects and Parameter objects (not shown in FIG. 7 for representing stored procedures and parameters within the database.

The schema layer objects above are used by the schema layer 58 to represent the structure of the databases 20 and can therefore report to the DAL 50 on one aspect of the reliability or "validity" of the FDC relative to each (e.g. 20a, 20b, 20c) cached database. Herein "validity" or "validation" of the FDC means that the cache is correctly structured as one or more databases of the enterprise application portal.

Validating the FDC for a particular data access may depend on the target database and the extent of the data access query. For example, the FDC of a database for queries targeting all of the rows of a table is considered "valid" if the total table row count in the databases equals the total table row count in the FDC and if the maximum table time stamp of the database is equal to the maximum table time stamp in the cache. For queries targeting filtered rows of a table, validation is handled differently as such queries use indexes when targeting the database as well as the cache. To guarantee cache validity for indexed rows without affecting system performance, the schema layer performs a time bound validity check during which it scans the cached table data row by row to find some rows which match the query filter and compare the indexed rows to see if these rows are found. If all the rows found within the time period match, it is assumed that the indexed cache is valid.

In some embodiments, if the DAL finds that the FDC is not valid, the DAL 50 sends a message via a message queue 59 to the CMS 90 indicating that one or more tables are out of synchronization. The CMS receives the message from the message queue, then runs a validation check and inserts or updates or deletes the cache data accordingly.

In addition, periodically refreshing the schema layer automatically adjusts for changes in the underlying schema of the databases. Refreshing the schema layer for changes in an underlying database and maintaining the validity of the full database cache may performed by the CMS of the present invention more fully described below.

The schema layer is used to parse data objects for cache data accesses according to the data stored in the database represented by the schema layer objects. For example, a "Person" object may represent an individual with attributes according to person that needs to be stored in the table data of the FDC. When the component hosting the schema layer (for example, the DAL component or the CMS component) processes an instance of an object containing data, it uses the schema layer to first verify that the object has all the properties for the matching object table. For example, upon receiving an instance of a "Person" object, the schema layer can confirm that the Person object must contain properties matching each of Column objects for the Person Table object. Thus, the schema layer can verify that the properties of the object match the database columns represented by the Column objects of the corresponding database Table object before retrieving or storing the object data.

As such, the schema layer 58 provides other benefits and advantages. As above, the schema layer 58 allows for the validation of data stored and updated to the FDC 80. Schema layer 58 allows for the identification of programming errors before corrupting the cache with writes to the FDC 80. Schema layer 58 allows the programming of "generic" code for managing change tracking for any of the table data 82 in the FDC, without having to write code that is tightly bound to the underlying database schema of each database in the enterprise portal application. Instead of having hard coded classes which represent specific database table structure in a schema, the DAL can use the schema layer object for the table to handle the same kind of functionality which would previously have required database schema specific hard coding. For example:

1) To identify unique rows in a generic "table" row, the DAL may use the corresponding schema table object to determine the properties which match its primary keys. The DAL may then compare two rows from two tables in any database by comparing the properties of the row object which match the name and types of the primary keys as found in the schema layer; or 2) SQL Queries which previously required a program to have hard codings, can now be written in a generic fashion because the codings can extract primary keys from the schema table object and use the column names within generic SQL templates—including not only the correct primary key values for any table in any database, but even their actual names. Effectively, the schema layer allows us to generalize entire classes of implementations that would previously have required us to write database schema specific code.

Schema layer 58 allows the code generation of paged select, insert, update and delete, stored procedures for any table in the database without additional programming effort. In contrast to convention object relational mapping (ORM) techniques, the schema layer described herein is designed to avoid "hard coding" of the structure of the database as object oriented code. Instead, the database structure is stored as schema data which can be queried to understand the database structure from the calling code. The schema layer improves upon conventional ORM tools by allowing calling code, such as the DAL code, to read and update the database while being aware of the database schema, thereby providing a single layer of code which is database agnostic, and while still allowing ORM like operations. Thus, the schema layer allows the DAL to invoke stored procedures or run direct SQL queries or modifications on any database. The schema layer is designed to handle different database vendors seamlessly by providing common interfaces which abstract vendor specific interfaces from the DAL.

Change Management System

In general, the CMS 90 of the enterprise portal application creates and maintains the FDC 80 in synchronization with one or more of the databases 20. In a preferred embodiment, the operation of the CMS for synchronizing the FDC allow all database access requests in the DAL to be directed to the FDC. Directing all data accesses to the FDC significantly reduces requests for data from the databases directly, thereby substantially reducing the load on the databases. Although the CMS 90 is shown and described herein as being used to create and maintain the FDC 80 in synchronization with one or more of the databases 20, it will be apparent in view of this disclosure that the CMS 90 described herein can be used, in accordance with various embodiments, to create and maintain (e.g., by validating and/or synchronizing) one or more databases, caches, clouds, servers, and/or search indexes (maintained systems) with respect to one or more additional databases, caches, clouds, servers, and/or search indexes (source systems), each associated with one of one or more system schemas.

For some enterprise portal applications in particular, for example, vehicle tracking, robotics, IoT (the Internet of Things) and e-commerce, even small reductions in the large volume of direct database accesses can substantially improve the performance of the databases and thus the overall responsiveness of the enterprise portal application. The improved performance allows the use of less expensive hardware for hosting the database servers. This can have a significant reduction in expense, especially on the cloud server embodiments, where costs are substantially increased when more powerful virtual machines are required and when the database load is higher. In some cases, cost savings can be five (5) times to eight (8) times compared to conventional caching methods and systems.

Figure 8:
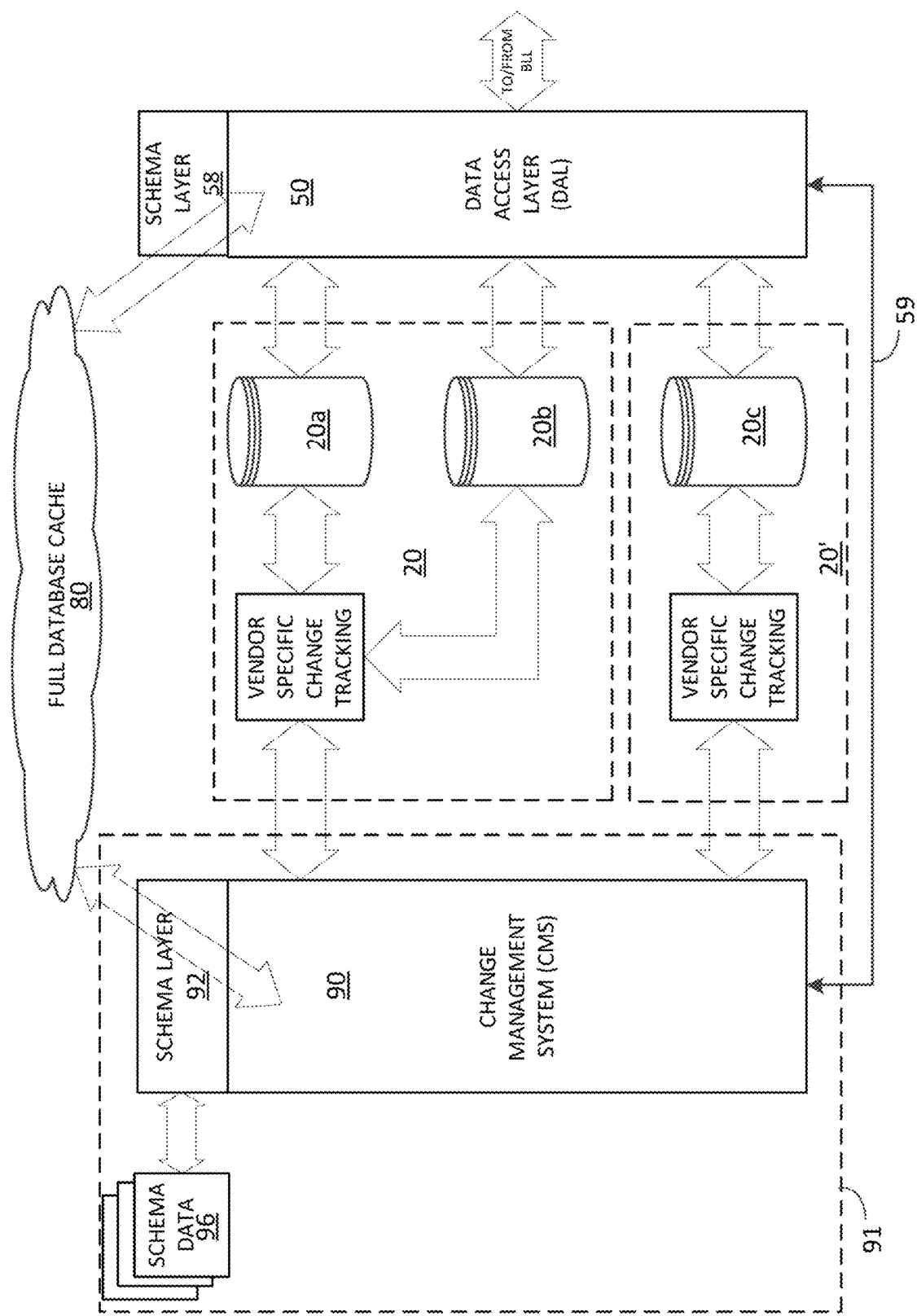
FIG. 8 shows a change management system in an enterprise portal application according to one aspect of the invention.

FIG. 8 depicts an embodiment of a change management system (CMS) of the enterprise portal application according to one aspect of the invention. As shown and described above, the RDBMS 20,20' may include the vendor specific drivers and vendor specific change tracking and change management systems (as depicted in FIG. 2), including a "local" database cache for each of the RDBMS. The databases may be accessed by SQL commands received and processed by the RDBMS. One skilled in the art would understand that database commands other than SQL commands may be used to access the databases of the present invention, and that without loss of generality, the databases referred to herein may take other forms, including non-relational databases. It will be understood that in referring to interactions with a database, for example, in receiving and processing data access requests using SQL, this assumes interactions with the RDBMS containing the database. Data stored and retrieved from the databases 20a,20b,20c may be cached by the RDBMS for faster repeat access using an internal cache (not shown).

As shown in FIG. 8, a system including a CMS 90 and a schema layer 92, which creates schema data 96. The CMS 90, schema layer 92, and the schema data 96 may be hosted in a common application or module or component or memory space 91 of the CMS 90. In some embodiments, the schema data 96 may further include custom index definitions (not shown). Custom index definitions allow a database developer to specify additional indexes within the cache to optimize the retrieval of data from the cache, thereby bypassing more complex queries from the database to the cache. Custom index definitions store the definitions of additional indexes—the actual index data for the table is stored in the FDC.

Schema layer 92 of the CMS 90 is as described above in view of FIG. 7 and further provided below. In general, the schema layer 92 is used by the CMS 90 for validation and for specifying how the raw table data is stored in the FDC. The schema layer 92 may also be used for generating queries by the CMS (e.g. filtering by the primary key of a table using the primary key column names for a table). Raw table data passes through the CMS (as changesets) to be stored in the table data of the FDC.

Schema data 96 is generated by the schema layer 92 and may be stored in the memory of any application using the schema layer which includes the CMS and any application using the DAL layer. As above described for the schema data of the DAL, schema data 96 is data that defines the structure and content of table data of a cached database (20a, 20b, 20c, for example), and the interrelationships between the table data Schema data 96 may include objects representing the structure of the rows and columns of the table data; the type, range, representation, and format of the fields of the table data; and the interrelationships between and among the tables, records, and fields of the table data 82,82' (FIG. 4). One skilled in the art would recognize that the particular organization of the schema data 96 as objects is a conceptual representation of how schema data may stored and manipulated, and that each "object" of the schema data may be represented by, without limitation, any type, form, and structure of data objects of a conventional object-oriented schema. The schema data 96 is used by the schema layer 92 during data access and updates to allow the FDC to validate the structure of the data, which is read and updated. In an embodiment, the schema data 96 may instead or additionally be included in the FDC of FIG. 4. However, caching systems do not perform well having large blocks of data, rather these systems prefer small key, value pairs, thus, including schema data in the FDC may reduce system performance.

In an embodiment of the CMS, the schema layer 92 is identical in structure and operation to the schema layer 58 of the DAL 50. Without departing from the scope described herein, the schema layer 58 and the schema layer 92 may not be the same in all aspects of their structure and operation. The schema data generated by the schema layer may be copies of the schema data sorted in each application which uses the schema layer. Alternatively, the schema data may be a single instance of the schema data stored in the FDC with concurrency protections. The schema layer of the CMS and the schema layer of the DAL may be run as a single code layer, for example, as a dynamic link library (DLL), accessed by the CMS or the DAL. Alternatively, the schema layer may be different instances of the schema layer code.

Custom index definitions (inside the schema data) provide the database developer the ability to specify that the CMS create a new index on a particular table in the FDC. This allows the DAL to request more complex queries from the cache and to avoid using the database for those queries.

Cache validity checks may be made periodically by the CMS using the same general techniques as above described for validating the cache using the schema layer of the DAL. The database cache for queries targeting all of the rows of a table is considered "valid" if the total table row count in the databases equals the total table row count in the full database cache and if the maximum table time stamp of the database is equal to the maximum table time stamp in the cache. The database cache for queries targeting filtered rows of a table is handled differently as such queries utilize indexes when targeting the database as well as the cache. To guarantee cache validity for indexed rows without affecting system performance, the schema layer does a time bound validity check during which it scans the cache table row by row to find some rows which match the query filter and compare the indexed rows to see if these rows are found. If the rows match, the indexed cache is valid.

The CMS 90 may, in some embodiments, use a vendor-specific RDBMS change tracking module, for example, the Microsoft SQL Server change tracking mechanism, to alert the CMS to changes in the underlying data scheme of a database under its control. Accordingly, the CMS may periodically and regularly update its representations of the schema of the database to reflect changes to the schema by design changes made to the database itself. In some embodiments, the design changes may be invalid, providing the CMS notice and opportunity to amend or alert the database operators that such a change has been attempted.

For updating raw table data, a periodic timer-based SQL change tracking query retrieves changes in the database which have been made since the last time the query was executed. Each time the change tracker query returns data, it also returns a number, analogous to a "timestamp". The next time the change tracker returns query data, it returns the previous "timestamp", so it will only return changes since this "timestamp". The database will return just the primary keys of the rows changed along with just the columns that have changed. The CMS will then update the "target" database cache table data. For deletions, the database returns the primary keys, so the deleted rows can be deleted from the target table data in the FDC. Note that in a preferred embodiment, each table in the database to be synchronized by the CMS may have a timestamp column added to each data table. Sometimes, the periodic timer-based SQL change tracking query throws an error which specifically happens only when the database schema has changed—this triggers the CMS to reload the entire schema of the specific database and update its schema data appropriately. In such cases, the FDC is also updated appropriately.

Figure 9:
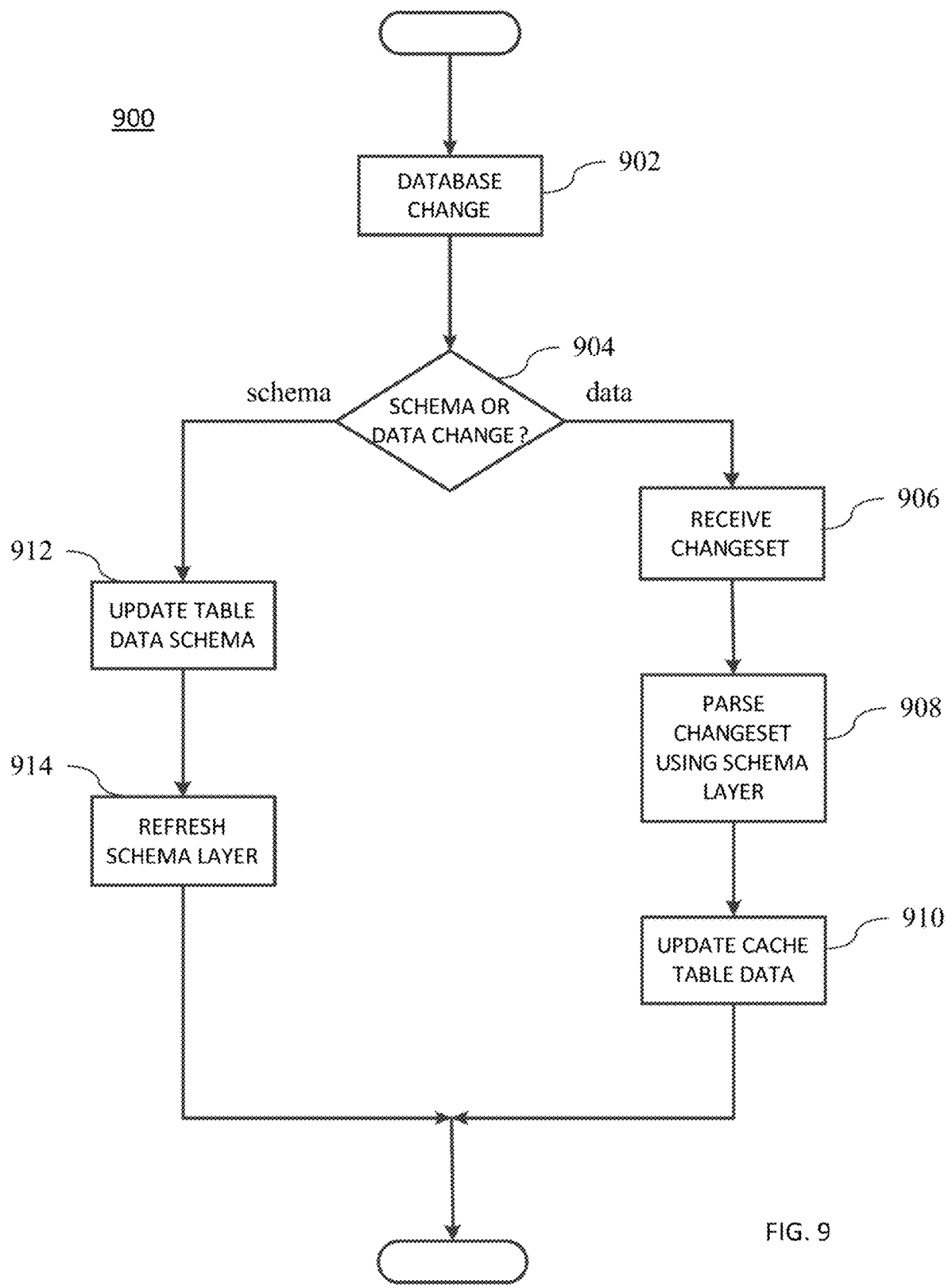
FIG. 9 is a flowchart depicting the synchronization of the full database cache by the change management system, according to one aspect of the present invention.

FIG. 9 illustrates an exemplary process 900 of updating and synchronizing the FDC upon a change in the database or database schema. At step 902, the CMS receives an indication that one or more of the databases 20 (20a, 20b, 20c) has changed. The indication of a database change may be received from the database or from a change tracking module associated with the database. At step 904, the CMS determines whether the change is to the data or to the database schema of the changed database. If the change is to data, at step 906, the CMS receives the changeset from the change tracking module. The CMS then uses the schema layer to parse the changeset, at step 908, using the schema layer to update (step 910) the cache table data from the changeset data. In a preferred embodiment, when the CMS adds or updates or deletes table rows, the CMS updates the index data accordingly.

Returning to step 904 of FIG. 9, if the change is to database schema, the CMS, at step 912 updates the Table Data Schema 98. At step 914, the CMS refreshes the schema layer with the changes to the database schema. It also updates the FDC objects appropriately.

In another embodiment, this database reconciliation process may also be initiated by the CMS periodically, for example, every 10 minutes or via message queue from the DAL. To optimize the database reconciliation, the CMS recognizes two conditions: (1) the cache has more rows than the database; (2) cache has fewer rows than the database; (3) the rows match, but the DAL recognized that the cache was out of date. Under condition (1), the CMS re-loads all of the rows of the one or more tables having more rows than the database. Under condition (2), the CMS uses the schema layer to determine the primary keys for the table, which are unique for each row. It then visits each of the rows of the table to find a database row matching the primary key values. Because the primary keys are unique to table rows, if the row matching the primary keys do not exist in the database, the CMS may delete that row from the cache. Under condition (3) where the cache has the same number of rows as the database, but some rows are stale and thus rendering the cache invalid, a row-by-row comparison of the timestamp column of each row is made to find the stale rows and to fix the out-of-date column values. In practice, these conditions does not occur absent an error in the coding of the CMS or if the DAL developer created a bug which corrupted the cache.

Various redundancies and parity checks are built into the system as designed, which constantly verifies that the FDC is up-to-date and not stale. Writes to the databases from the DAL 50, in a preferred embodiment, are updated to the FDC 80 directly as a failsafe. However, writes to the databases from the DAL 50 that fail to update the FDC, or writes to the databases from external systems, for example, are synchronized by the CMS using its regular synchronization processed to ensure that the FDC is available and "valid" for DAL access.

The systems and methods described above are further designed to handle multi-tenant enterprise portal applications. Because the schema layer is not "hard coded" to the schema of any specific database, the schema layer can handle any number of database of any schema. The CMS may then synchronize databases with or without the same schema at the same time. Without the schema layer, conventional systems which are hard coded to the schema of a database require reprogramming when the underlying database schema gets modified over time, thereby increasing maintenance costs. Here, the schema layer as described herein and above treats the database schema as "data" which is updated automatically and dynamically when the underlying database schema is updated.

Another advantage over conventional systems is that accessing the cache from the DAL and not having to make a network call to the database server, which may be heavily loaded or whose data network is saturated with access requests from multiple subsystems, provides performance improvements, even over conventional systems and methods, where the database supports a full database cache which it maintains. Such performance improvements increase the further the database servers are hosted away from the DAL servers. This can also be an advantage in scenarios where the database servers are located in one region of the world and the DAL servers communicate with an FDC, where the FDC is replicated in regions around the world closer to the DAL server. Because it is substantially harder to replicate databases over the internet across the world than it is to replicate a cache in the same circumstances, many companies already use replicated caching systems with their regional servers. In this scenario, utilizing the methods and systems described herein improve the overall solution because the cache is replicated for any database seamlessly, in a faster, more efficient manner, thereby making all the data reads substantially faster from the local regional cache, while only the database writes require communication with the remote, unified database server region.

In further advantage, tracking changes efficiently and at high speed addresses the need to perform database backup; database replication with multiple databases requiring synchronization for co-located and remote databases, potentially world-wide; synchronizing local databases with remote central databases, for example, warehouse databases; synchronization of databases in one technology (RDBMS) to another technology (NOSQL like MongoDB); synchronizing databases with a cache. With such techniques as described herein, enterprise search engines may use an index that is kept up-to-date, such that users see changes in the system as soon as possible in their search results, thereby providing more accurate search results.

Search is another critical database application where the searched database needs to be kept in synchronization. Manual synchronization is slow and bug ridden. Updating the search index at the same time data is saved in the code is inefficient and does not handle the situation where a database migration script (for example) modifies data. Hence, where the CMS described herein may be solely responsible for synchronizing the database with the search index, for applications such as internet-of-things (IoT) and robotics, where robots or devices used in local facilities and store data locally in the database, the CMS allows synchronizations of such local databases to the remote cloud. Synchronizing RDBMS to MongoDB, or any other NoSQL database, becomes possible, without having to resort to highly specialized, non-reusable components built with much time and effort. Here, the CMS may be used seamlessly to synchronize the IoT or robotics applications database to a cloud-based NoSQL database, thereby saving hundreds of thousands of dollars in design, development, implementation and quality assurance costs. Not only does the CMS track all changes comprehensively and synchronize it—the CMS as described herein uses minimal hard disk space and memory.

It should be understood that the present invention may be implemented with software and/or hardware. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." As will be appreciated by one skilled in the art, aspects of the invention may be embodied as a system, method or computer program product.

Aspects of the present invention are described with reference to flowcharts, illustrations and/or block diagrams of methods and apparatus (systems). The flowcharts and block diagrams may illustrate system architecture, functionality, or operations according to various embodiments of the invention. Each step in the flowchart may represent a module, which comprises one or more executable instructions for implementing the specified function(s). In some implementations, steps shown in succession may in fact be executed substantially concurrently. Steps may be performed by special purpose hardware-based systems that perform the specified functions or acts, or combinations of special purpose hardware and computer instructions.

Computer instructions for execution by a processor carrying out operations of the present invention may be written one or more programming languages, including scripting languages, database query languages, including but not limited to structured query language (SQL), object-oriented programming languages such as C#, C++, Python, or Java programming languages. Computer program instructions may be stored on a computer readable medium that can direct the system via a data processor to function in a particular manner, including executing instructions which implement the steps specified in a flowchart and/or system block diagram described herein.

Figure 10:
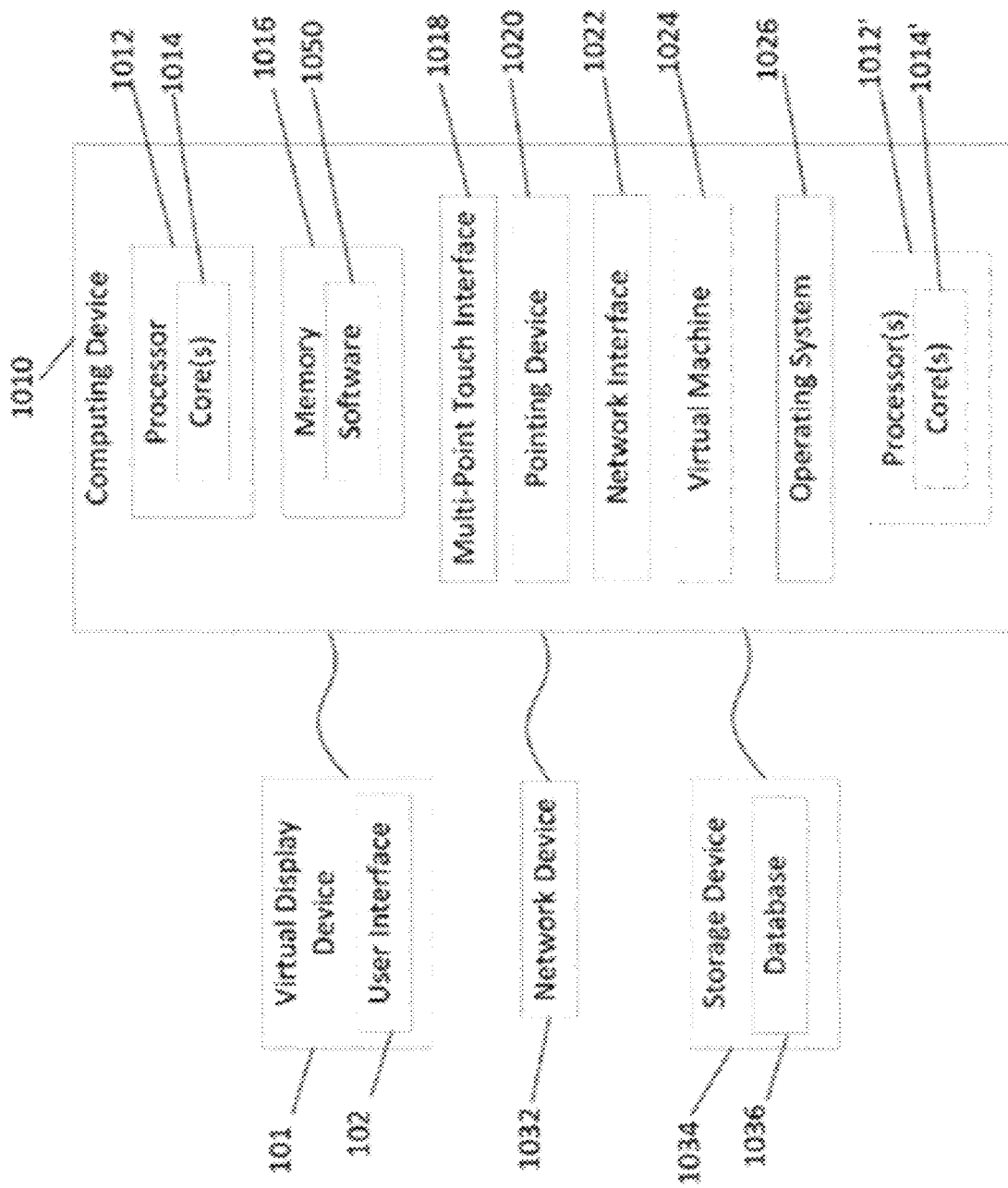
FIG. 10 is an exemplary computer system.

FIG. 10 is a block diagram of an exemplary computing device 1010 such as can be used, or portions thereof, in accordance with various embodiments as described above with reference to FIGS. 1-11. The computing device 1010 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1016 included in the computing device 1010 can store computer-readable and computer-executable instructions or software for performing the operations disclosed herein. For example, the memory can store software application 1040 which is programmed to perform various of the disclosed operations as discussed with respect to FIGS. 1-11.

The computing device 1010 can also include configurable and/or programmable processor 1012 and associated core 1014, and optionally, one or more additional configurable and/or programmable processing devices, e.g., processor(s) 1012' and associated core (s) 1014' (for example, in the case of computational devices having multiple processors/cores), for executing computer-readable and computer-executable instructions or software stored in the memory 1016 and other programs for controlling system hardware. Processor 1012 and processor(s) 1012' can each be a single core processor or multiple core (1014 and 1014') processor.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 1016 can include a computational device memory or random access memory, such as but not limited to DRAM, SRAM, EDO RAM, and the like. Memory 1016 can include other types of memory as well, or combinations thereof A user can interact with the computing device 1010 through a visual display device 1001 such as a computer monitor, which can display one or more user interfaces 1002 that can be provided in accordance with exemplary embodiments. The computing device 1010 can include other I/O devices for receiving input from a user, for example, a keyboard or any suitable multi-point touch interface 1018, a pointing device 1020 (e.g., a mouse). The keyboard 1018 and the pointing device 1020 can be coupled to the visual display device 1001. The computing device 1010 can include other suitable conventional I/O peripherals.

The computing device 1010 can also include one or more storage devices 1034, such as but not limited to a hard-drive, CD-ROM, or other computer readable media, for storing data and computer-readable instructions and/or software that perform operations disclosed herein. Exemplary storage device 1034 can also store one or more databases for storing any suitable information required to implement exemplary embodiments. The databases can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode. In an exemplary embodiment, the operating system 1026 can be run on one or more cloud machine instances.

Figure 11:
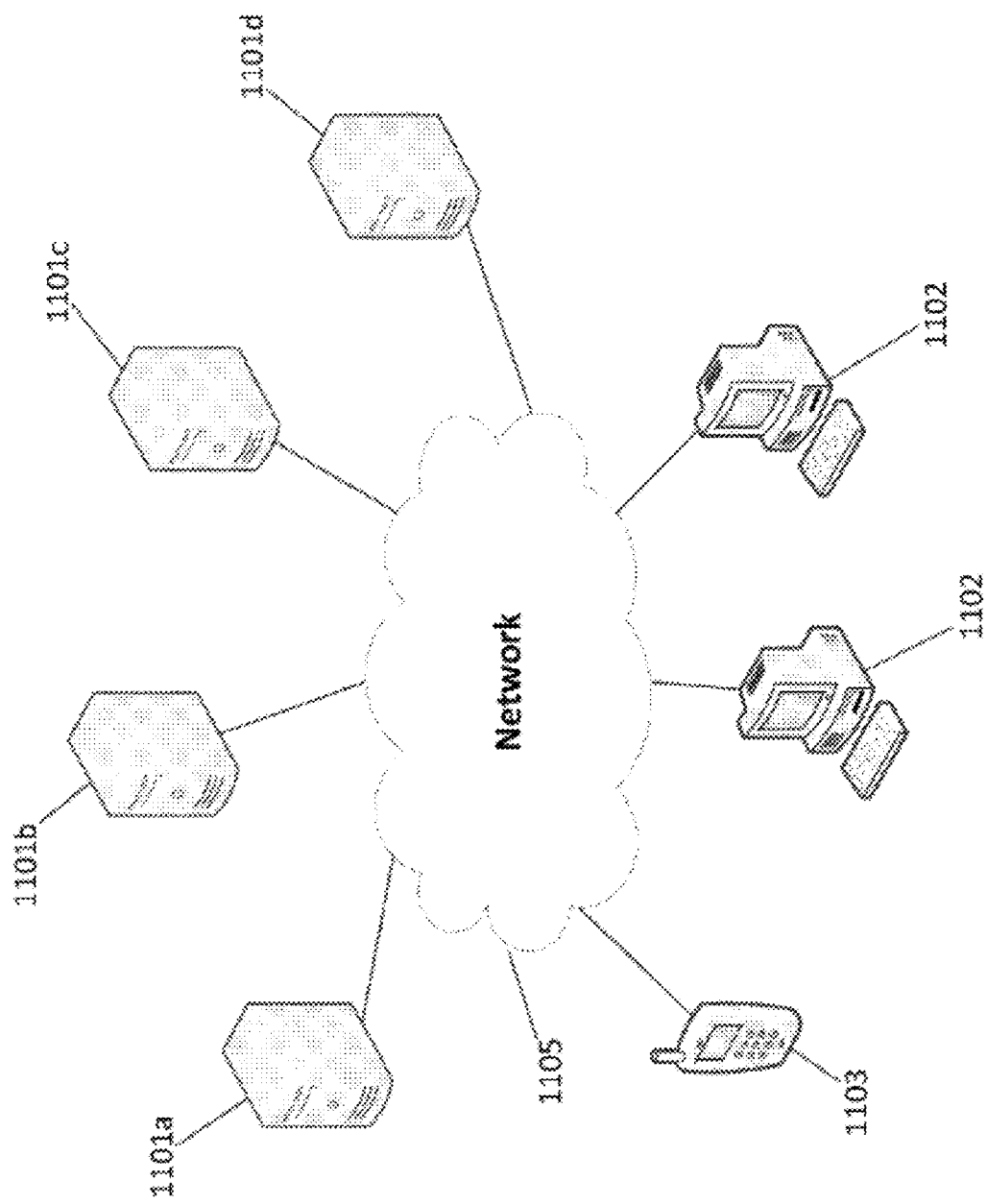
FIG. 11 is an exemplary distributed network.

FIG. 11 is an example computational device block diagram of certain distributed embodiments. Although FIG. 3, and portions of the exemplary discussion above, make reference to a enterprise portal application system 100 operating on a single computing device, one will recognize that various of the client interfaces 40 and databases 20 and components 50, 60, 70, 80 and 90, within the enterprise portal application 100 may instead be distributed across a network 1105 in separate server systems 1101a-d and possibly in user systems, such as kiosk, desktop computer device 1102, or mobile computer device 1103. For example, users may download an application to their desktop computer device or mobile computer device, which is configured to show an interactive digital rendering of the meeting room and perform the operations of the display device 1001 and graphical user interface 1002. In some distributed systems, the modules of the enterprise portal application 100 can be separately located on server systems 1101a-d and can be in communication with one another across the network 1105.

What is claimed is:

1. A method of data retrieval in an enterprise portal application comprising,
receiving, in a data access layer, a request for object data from a business logic layer;
validating, by a schema layer in communication with the data access layer, that cache data of a cache and database data of one or more databases of the enterprise portal application are synchronized, wherein:
the cache data represents database data in a database schema of the database, the cache data comprising table data and index data of the one or more databases of the enterprise portal application,
the schema layer comprises database schema objects for representing the schema of the one or more databases, wherein the database schema objects are created by calling each respective one of the databases directly and retrieving a structure of each respective one of the databases; wherein the design components of the database structure are represented using object-oriented programming; and wherein an instance of each database schema object retrieved fully defines the schema of each respective one of the databases; and
the schema layer is configured to generate the cache data representing the database data in the database schema;
retrieving, if the cache is validated, the cache table data from the cache data; and
returning the object data to the business logic layer, the object data corresponding to the retrieved cache table data.

2. The method of claim 1, wherein, if validated, the cache data comprises an entirety of the database table data and database index data of the one or more databases.

3. The method of claim 1, wherein validating the cache comprises comparing a total database row count of the one or more databases with a cache row count.

4. The method of claim 1, wherein validating the cache comprises comparing a maximum time stamp of one or more database tables of the one or more databases to a maximum time stamp of a corresponding cache table.

5. The method of claim 1, wherein validating the cache comprises comparing database table data columns and database table data types of the one or more database tables to cache table data columns and cache table data types for a corresponding cache table in the cache data.

6. The method of claim 1, wherein if the retrieving of the table data from the validated cache returns no data, returning null object data to the business logic layer.

7. The method of claim 1, wherein the cache index data includes indexes of the one or more databases.

8. The method of claim 7, wherein retrieving the cache table data from the cache further comprises searching the indexes of the cache index data to locate the cache table data to be retrieved.

9. The method of claim 1, wherein the validity of the cache is maintained by a schema layer in communication with a change management system, wherein the schema layer is configured to generate the cache data representing the database data in the database schema.

10. The method of claim 9, further comprising sending, if the cache is invalidated, a message to the change management system to synchronize the cache with the one or more databases.

11. The method of claim 9, wherein maintaining the cache comprises periodically validating the cache by the change management system; and, if invalidated, synchronizing the cache to the one or more databases.

12. The method of claim 9, wherein the schema layer in communication with the change management system generates database schema objects that are identical to the database schema objects generated by the schema layer in communication with the data access layer.

13. The method of claim 11, further comprising retrieving, if the cache is invalidated, a changeset comprising changes to the one or more databases.

14. The method of claim 13, further comprising:
comparing the schema of the changeset to the database schema objects created by the schema layer from the database to verify that the changeset is compatible with the cache data and the database schema objects, and
at least one of passing the changeset to the cache for updating the cache data or deleting and recreating the corresponding database schema objects in the schema layer.

15. The method of claim 13, wherein, if the cache is invalidated, waiting a finite time period during a database write operation, and retrieving database table data directly from the one or more databases if the write operation takes more than a configurable period of time.

16. A data retrieval system for an enterprise portal application, comprising:
a cache including cache data representing database data in a database schema, the cache data comprising table data and index data of one or more databases of the enterprise portal application;
a schema layer comprising database schema objects for representing the schema of the one or more databases, wherein:
the schema layer comprises database schema objects for representing the schema of the one or more databases, wherein the database schema objects are created by calling each respective one of the databases directly and retrieving a structure of each respective one of the databases; wherein the design components of the database structure are represented using object-oriented programming; and wherein an instance of each database schema object retrieved fully defines the schema of each respective one of the databases; and
the schema layer is configured to generate the cache data representing the database data in the database schema; and
a data access layer in communication with a business logic layer, the cache, the schema layer, and the one or more databases, the data access layer including:
one or more cache access modules for providing communication between the data access layer and the cache,
one or more database access modules for providing communication between the data access layer and the one or more databases, and
a gatekeeper module configured to retrieve cache table data from the cache via the cache access modules in response to validation of the cache and further configured to retrieve database table data from the one or more databases via the database access modules in response to invalidation of the cache,
wherein the data access layer is configured to:
receive a request for object data from a business logic layer,
validate, by the schema layer, that the cache data of the cache and database data of the one or more databases are synchronized,
retrieve, by the gatekeeper module, if the cache is validated, the cache table data from the cache data, and
return the object data to the business logic layer, the object data corresponding to the retrieved cache table data.

17. The system of claim 16, the gatekeeper module further configured to:
retrieve, if the cache is invalidated, a changeset comprising changes to the one or more databases;
compare the schema of the changeset to the database schema objects created by the schema layer from the database to verify that the changeset is compatible with the cache data and the database schema objects, and
at least one of pass the changeset to the cache for updating the cache data or delete and recreate the corresponding database schema objects in the schema layer.

18. The system of claim 16, wherein the validity of the cache is maintained by a schema layer in communication with a change management system, wherein the schema layer is configured to generate the cache data representing the database data in the database schema.

19. The system of claim 18, wherein maintaining the cache comprises periodically validating the cache by the change management system; and, if invalidated, synchronizing the cache to the one or more databases.

20. The system of claim 18, wherein the schema layer in communication with the data access layer and the schema layer in communication with the change management system generate identical database schema objects.

21. The system of claim 20, wherein the schema layer in communication with the data access layer and the schema layer in communication with the change management system are instances of identical schema layers.

22. A non-transitory computer readable medium including program instructions for execution by a processor of an enterprise portal application, the instructions causing the processor to:
receive, in a data access layer, a request for object data from a business logic layer;
validate, by a schema layer in communication with the data access layer, that cache data of a cache and database data of one or more databases of the enterprise portal application are synchronized, wherein:
the cache data represents database data in a database schema of the database, the cache data comprising table data and index data of the one or more databases of the enterprise portal application, and
the schema layer comprises database schema objects for representing the schema of the one or more databases, wherein the database schema objects are created by calling each respective one of the databases directly and retrieving a structure of each respective one of the databases; wherein the design components of the database structure are represented using object-oriented programming; and wherein an instance of each database schema object retrieved fully defines the schema of each respective one of the databases; and the schema layer is configured to generate the cache data representing the database data in the database schema;

retrieve, if the cache is validated, the cache table data from the cache data; and return the object data to the business logic layer, the object data corresponding to the retrieved cache table data.

* * * * *